(12) United States Patent
Unemura

(10) Patent No.: US 7,647,607 B2
(45) Date of Patent: Jan. 12, 2010

(54) VIEWING LIMIT APPARATUS, VIEWING LIMIT SYSTEM, AND VIEWING LIMIT PROGRAM

(75) Inventor: Toyoaki Unemura, Itami (JP)

(73) Assignee: Panasonic Corporation, Osaka (JP)

( * ) Notice: Subject to any disclaimer, the term of this patent is extended or adjusted under 35 U.S.C. 154(b) by 1014 days.

(21) Appl. No.: 10/481,407

(22) PCT Filed: Jul. 11, 2002

(86) PCT No.: PCT/JP02/07083

§ 371 (c)(1),
(2), (4) Date: Dec. 30, 2003

(87) PCT Pub. No.: WO03/009594

PCT Pub. Date: Jan. 30, 2003

(65) Prior Publication Data

US 2004/0158851 A1    Aug. 12, 2004

(30) Foreign Application Priority Data

Jul. 16, 2001  (JP) .............................. 2001-214978
Jul. 26, 2001  (JP) .............................. 2001-225921
Jun. 26, 2002  (JP) .............................. 2002-185953

(51) Int. Cl.
*H04N 7/16* (2006.01)
*H04N 7/173* (2006.01)
*G06F 3/00* (2006.01)

(52) U.S. Cl. ........................ 725/28; 725/39; 725/110; 725/114

(58) Field of Classification Search ................ 725/28, 725/39, 110, 114
See application file for complete search history.

(56) References Cited

U.S. PATENT DOCUMENTS

| 5,552,837 | A | * | 9/1996 | Mankovitz ................... 725/25 |
| 5,610,653 | A | * | 3/1997 | Abecassis ................... 348/170 |
| 5,751,335 | A | | 5/1998 | Shintani |
| 6,144,401 | A | | 11/2000 | Casement et al. |
| 6,449,766 | B1 | | 9/2002 | Fleming |

(Continued)

FOREIGN PATENT DOCUMENTS

CN         1172397        2/1998

(Continued)

OTHER PUBLICATIONS

English language Abstract and partial translation of JP 2001-157188.

(Continued)

*Primary Examiner*—Christopher Kelley
*Assistant Examiner*—Franklin S Andramuno
(74) *Attorney, Agent, or Firm*—Greenblum & Bernstein PLC

(57) ABSTRACT

First rating information, together with a television broadcasting signal, is transmitted, and second rating information, together with electronic program guide information, is transmitted. A controller extracts the first rating information from video data decoded by a video decoder, and extracts the second rating information from EPG data decoded by an EPG processor. At the time of reserving a program, it is judged whether or not the program can be reserved by restricting viewing on the basis of the second rating information, and the result of the judgment is displayed on a program reservation setting guide.

19 Claims, 31 Drawing Sheets

U.S. PATENT DOCUMENTS

| | | | |
|---|---|---|---|
| 6,519,412 B1 * | 2/2003 | Kim | 386/94 |
| 6,898,799 B1 * | 5/2005 | Jarman | 725/25 |
| 7,167,895 B1 * | 1/2007 | Connelly | 709/203 |
| 7,210,158 B1 | 4/2007 | Forler | |
| 2002/0001448 A1 | 1/2002 | Jeong | |
| 2004/0261099 A1 * | 12/2004 | Durden et al. | 725/32 |

FOREIGN PATENT DOCUMENTS

| | | |
|---|---|---|
| JP | 8-251121 | 9/1996 |
| JP | 9-037168 | 2/1997 |
| JP | 2000-175117 | 6/2000 |
| JP | 2000-201304 | 7/2000 |
| JP | 2000-287144 | 10/2000 |
| JP | 2000-354209 | 12/2000 |
| JP | 2001-16565 | 1/2001 |
| JP | 2001-145033 | 5/2001 |
| JP | 2001-157188 | 6/2001 |
| JP | 2001-285822 | 10/2001 |
| WO | 99/31881 | 6/1999 |
| WO | 99/44361 | 9/1999 |
| WO | 00/52930 | 9/2000 |
| WO | 01/49030 | 7/2001 |

OTHER PUBLICATIONS

English language Abstract and partial translation of JP 9-037168.
English Language Abstract of JP 2000-354209.
English Language Abstract of JP 2001-16565.
English Language Abstract of JP 2001-145033.
English Language Abstract of JP 2000-201304.
English Language Abstract of JP 2000-287144.
English Language Abstract of JP 2001-157188.
English Language Abstract of JP 2000-175117.
English Language Abstract of JP 2001-285822.

* cited by examiner

Fig. 4

| VIEWING RESTRICTION SETTING WINDOW | | |
|---|---|---|
| TV-Y | YES | NO |
| TV-Y7 | YES | NO |
| TV-G | YES | NO |
| TV-PG | YES | NO |
| TV-14 | YES | NO |
| TV-MA | YES | NO |

Fig. 5

JUNE 27, 2001 (WED) ELECTRONIC PROGRAM GUIDE
NOW JUNE 27 (WED) 21:10

| TIME | TV-BS1 | TV-BS2 | TV-BS3 | TV-BS4 |
|---|---|---|---|---|
| 21:00 | BUSINESS NEWS | WIMBLEDON TENNIS<br><br>WOMEN'S SINGLES<br><br>☆☆☆ vs ✱✱✱<br><br>□□□ vs ✱✱✱ | WIMBLEDON TENNIS<br><br>MEN'S SINGLES<br><br>○○○ vs ✱✱✱<br><br>△△△ vs ✱✱✱ | CLASSICAL CONCERT<br><br>BEETHOVEN:SYMPHONY NO. 7<br><br>TCHAIKOVSKY'S SYMPHONY NO. 4 |
| 21:30 | | | | |
| 22:00 | SUSPENSE SERIES | | | |

Fig. 6

PROGRAM RESERVATION SETTING GUIDE

NOW JUNE 27 (WED) 21:00~

| TIME | TV-BS1 | |
|---|---|---|
| 22:00 | SUSPENSE SERIES | THIS PROGRAM CANNOT BE RESERVED BY VIEWING RESTRICTION.<br><br>RATING OF THIS PROGRAM IS TV-14.<br><br>CURRENT VIEWING RESTRICTION IS TV-Y7. |
| 21:30 | | |
| 22:00 | | |

Fig. 10

PROGRAM RECORDING RESERVATION SETTING GUIDE

NOW JUNE 27 (WED) 21:00~

| TIME | TV-BS1 | |
|---|---|---|
| 22:00 | SUSPENSE SERIES | THIS PROGRAM CANNOT BE RESERVED BY VIEWING RESTRICTION. |
| 21:30 | | RATING OF THIS PROGRAM IS TV-14. |
| 22:00 | | CURRENT VIEWING RESTRICTION IS TV-Y7. |

Fig. 13

| FIRST EPG DATA | |
|---|---|
| DATA TRANSMISSION FORMAT | |
| No | BYTE UNIT |
| 1 | EPG START CODE |
| 2 | PROGRAM TITLE CODE |
| 3 | PROGRAM TITLE CHARACTER CODE |
| 4 | PROGRAM TITLE CHARACTER CODE |
| ~ | ~ |
| 34 | PROGRAM TITLE CHARACTER CODE 3 |
| 35 | PROGRAM TITLE END CODE |
| 36 | PROGRAM START TIME CODE |
| 37 | UPPER TWO DIGITS OF START YEAR |
| 38 | LOWER TWO DIGITS OF START YEAR |
| 39 | START MONTH |
| 40 | START DATE |
| 41 | START TIME |
| 42 | START MINUTE |
| 43 | PROGRAM TIME LENGTH |
| 44 | PROGRAM KEY WORD END CODE |
| 45 | PROGRAM KEY WORD |
| ~ | ~ |
| 56 | PROGRAM KEY WORD 3 |
| 57 | RATING START CODE |
| 58 | RATING LOWER BYTE |
| 59 | RATING HIGHER BYTE |
| 60 | EPG END CODE |

| n-TH EPG DATA | |
|---|---|
| DATA TRANSMISSION FORMAT | |
| No | BYTE UNIT |
| 1 | EPG START CODE |
| 2 | PROGRAM TITLE CODE |
| 3 | PROGRAM TITLE CHARACTER CODE |
| 4 | PROGRAM TITLE CHARACTER CODE |
| ~ | ~ |
| 34 | PROGRAM TITLE CHARACTER CODE 3 |
| 35 | PROGRAM TITLE END CODE |
| 36 | PROGRAM START TIME CODE |
| 37 | UPPER TWO DIGITS OF START YEAR |
| 38 | LOWER TWO DIGITS OF START YEAR |
| 39 | START MONTH |
| 40 | START DATE |
| 41 | START TIME |
| 42 | START MINUTE |
| 43 | PROGRAM TIME LENGTH |
| 44 | PROGRAM KEY WORD END CODE |
| 45 | PROGRAM KEY WORD |
| ~ | ~ |
| 56 | PROGRAM KEY WORD 3 |
| 57 | RATING START CODE |
| 58 | RATING LOWER BYTE |
| 59 | RATING HIGHER BYTE |
| 60 | EPG END CODE |

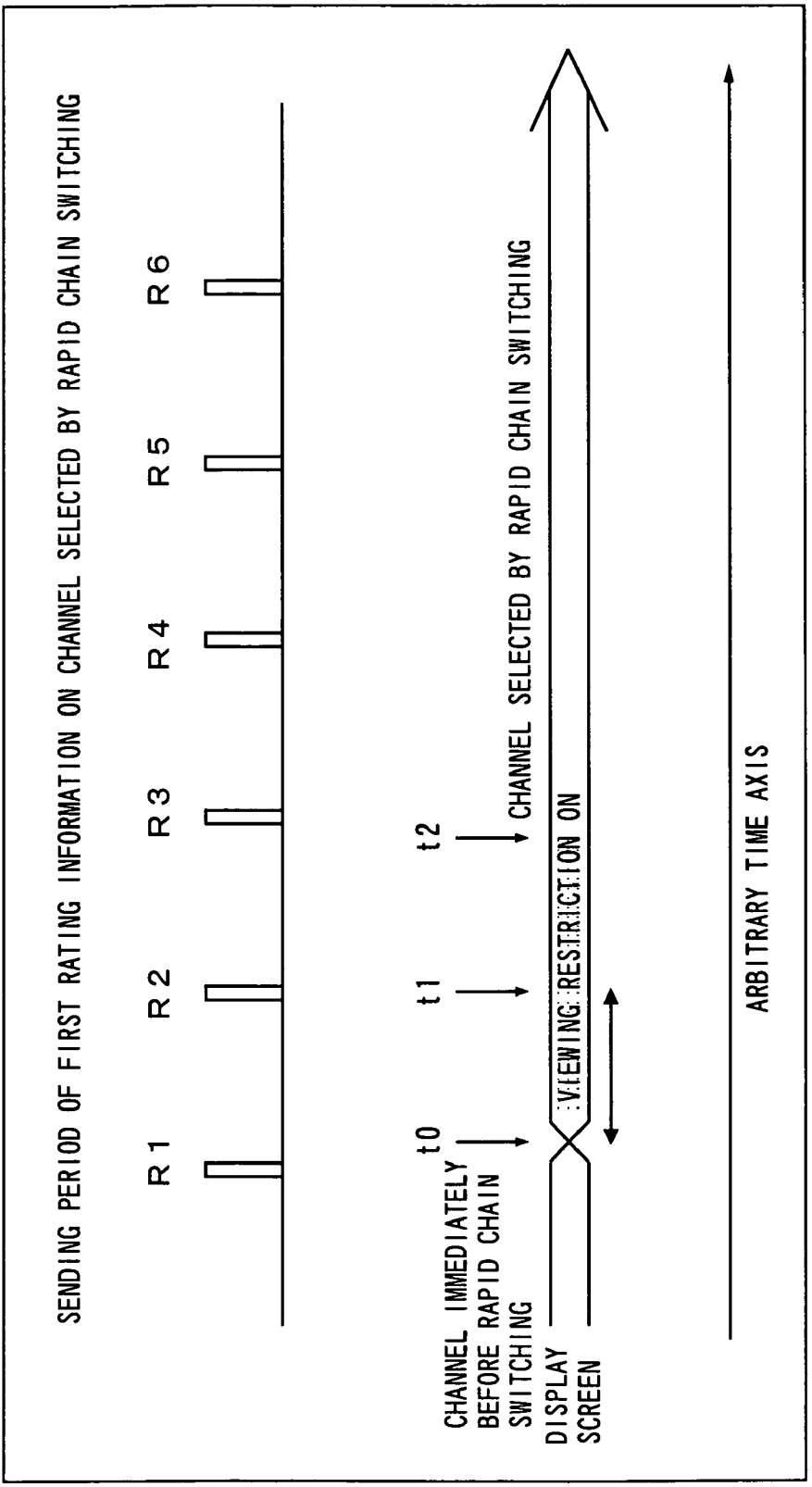

Fig. 27

[CONTENTS OF TV RATING IN US]

| RATING DISPLAY | CONTENTS |
|---|---|
| TV - Y | FOR ALL CHILDREN. THERE IS NO POSSIBILITY THAT EVEN YOUNG CHILDREN BETWEEN THE AGES OF TWO AND SIX ARE AFRAID OF IT. |
| TV - Y7 | FOR CHILDREN OF SEVEN OR MORE YEARS OF AGE. IT IS SUITABLE FOR CHILDREN WHO CAN DISTINGUISH BETWEEN FICTION AND REALITY. IT MAY INCLUDE UNREAL OR COMIC VIOLENCE WHEN THE VIOLENCE IS EXTREAM, SYMBOL "FV" IS SIMULTANEOUSLY USED. |
| TV - G | FOR ALL AGE GROUPS. THERE IS NO PROBLEM IF CHILDREN VIEW IT. IT HARDLY INCLUDES VIOLENCE, SEXUAL SCENES, AND SO ON. |
| TV - PG | INSTRUCTION BY PARENTS IS DESIRED. IT ALSO INCLUDES CONTENTS UNSUITABLE FOR YOUNG CHILDREN. WHEN IT INCLUDES VIOLENCE (S), SEXUAL SCENES (S), VULGAR LANGUAGE (L), AND OBSCENCE CONVERSATION (D), THEY ARE RESPECTIVELY ASSIGNED SYMBOLS V, S, L, AND D. |
| TV - 14 | FOR 14 OR MORE YEARS OF AGE. IT INCLUDES EXTREME VIOLENCE AND SEXUAL SCENES, EXTREMELY VULGAR LANGUAGE, AND EXTREMELY OBSCENCE CONVERSATION, THEY ARE RESPECTIVELY ASSIGNED SYMBOLS V, S, L, AND D. |
| TV - MA | FOR AJULTS OF 17 OR MORE YEARS OF AGE. IT INCLUDES NAKED VIOLENCE, BLATANTLY SEXUAL ACT, AND BLATANTLY VULBGAR LANGUAGE, SYMBOLS V, S, AND L ARE RESPECTIVELY ASSIGNED. |

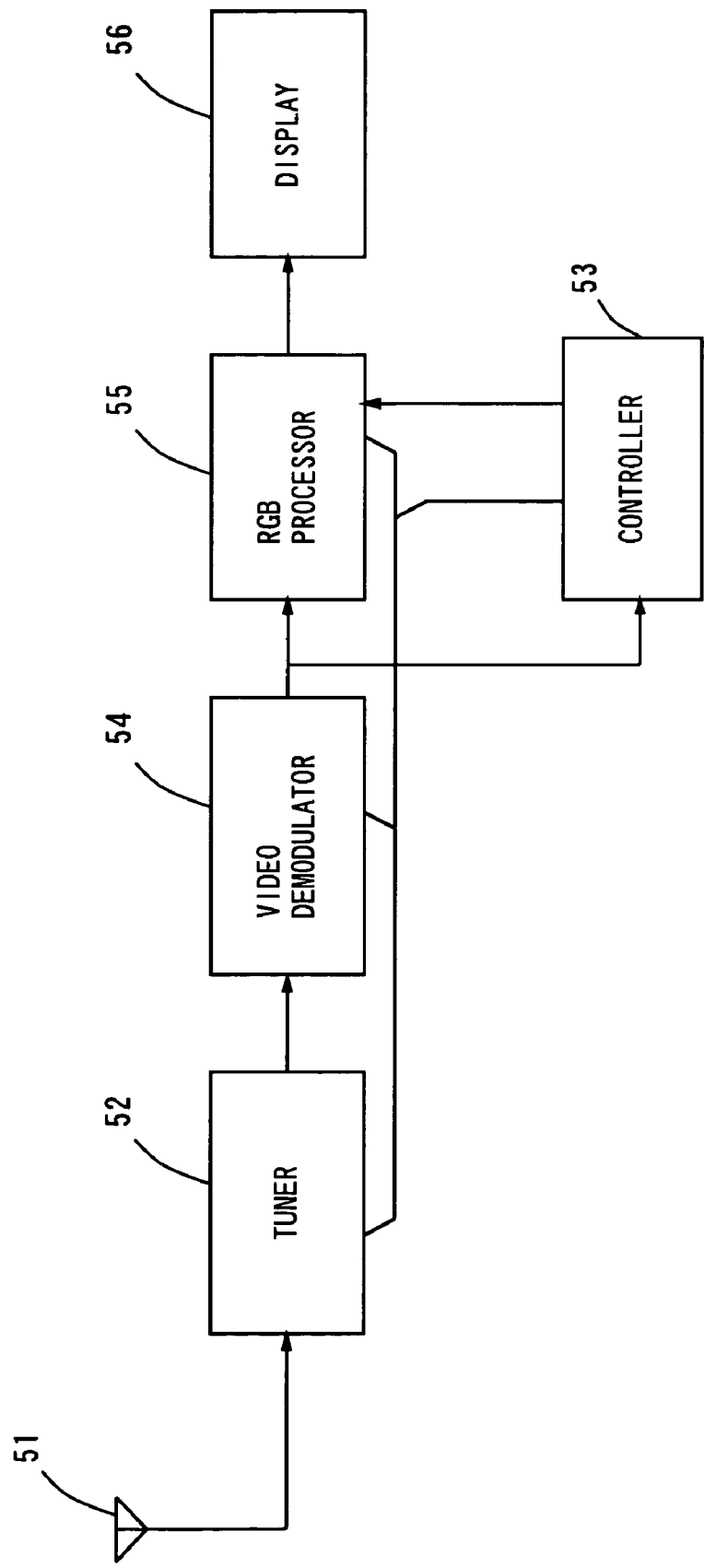

Fig. 29　　PRIOR ART

| | | DATA TRANSMISSION FORMAT | |
|---|---|---|---|
| No | FIRST BYTE | | SECOND BYTE |
| 1 | START CODE | 0x01 | RATING CODE 0x05 |
| 2 | CONTENTS OF RATING | 0x** | CONTENTS OF RATING 0x** |
| 3 | END CODE | 0x0F | CHECK SUM 0x** |

VIEWING LIMIT APPARATUS, VIEWING LIMIT SYSTEM, AND VIEWING LIMIT PROGRAM

This application is a 371 of PCT/JP02/07083 Jul. 11, 2002.

TECHNICAL FIELD

The present invention relates to a viewing restricting apparatus that restricts the viewing of a particular program or channel, a viewing restricting system, and a transmitter and a viewing restricting program used therefor.

BACKGROUND ART

In recent television broadcasting, extremely violent or obscene expressions are used in the contents of some of broadcasting programs, and extremely abusive conversation which cannot be put up with is made in a so-called variety program. Therefore, there is a growing tendency to restrict the viewing of the broadcasting programs as ones which are not preferable from the point of view of education of children.

Furthermore, in some of broadcasting channels, a program for adults is broadcast as a dedicated channel for adjusts, and viewing is restricted such that the program cannot be viewed unless a password is entered. The tendency to restrict viewing is particularly significant in the U.S. The 1996 Telecommunication Law which is a new telecommunication law was enacted during the term of office of President Clinton, and rating information related to a rating representing the degree of extremity of the contents of a program is forced to be superimposed on a television broadcasting signal and transmitted toward a broadcasting station. A television receiver that receives the television broadcasting signal is obliged to contain a viewing restricting function such that the restriction of viewing utilizing the rating information can be enforced.

Specifically, the rating information is superimposed on the television broadcasting signal in the 21-st horizontal scanning period (21H) of an odd field in a vertical blanking period on the side of the broadcasting station. The contents of the rating are illustrated in FIG. 27. The rating information is superimposed on the television broadcasting signal in the 21H of the odd field and sent at intervals of less than five seconds as data (packet data) in the form of a packet from the broadcasting station.

Of course, it is also possible to insert the rating information into a bit stream as a digital broadcasting signal.

On the other hand, the television receiver has, on the side of a receiver, that is, on the side of a user, a muting function for setting the viewing restriction level of a program which a guardian to a child does not desire the child to view by a viewing restricting function is set by a rating, not to normally reproduce a video and an audio when a program or a channel having a rating which is not less than the set viewing restriction level.

The muting function is also performed similarly with respect to a so-called picture-in-picture or a closed caption which is subtitle display broadcasting for people with hearing difficulties or for non-native speakers of English in the U.S.

The restriction of viewing is generally set and released through the entry of a password composed of a four-digit number or the like. FIG. 28 is a block diagram showing the configuration of a conventional television receiver having a viewing restricting function.

The television receiver comprises an antenna 51 for television broadcasting, a tuner 52, a controller 53, a video demodulator 54, an RGB processor 55, and a display 56. The tuner 52 frequency-converts a television broadcasting signal received by the antenna 51. The video demodulator 54 comprises a video intermediate frequency amplifier, a video detector, and so forth, and demodulates a high-frequency signal fed by the tuner 52 into a video signal. The RGB processor 55 converts the video signal fed from the video demodulator 54 into an RGB signal. The display 56 is constituted by a CRT (Cathode-Ray Tube), an LCD (Liquid Crystal Display), or the like, and displays the RGB signal fed from the RGB processor 55 as a video. The controller 53 controls the tuner 52, the video demodulator 54, and the RGB processor 55.

The operations of the television receiver shown in FIG. 28 will be described. Rating information is transmitted as packet data having a data transmission format shown in FIG. 29 from a broadcasting station. The packet data indicates a rating provided by an extended data service performed in North America.

A television broadcasting signal including rating information is received by the antenna 51, and is fed to the tuner 52. An arbitrary channel is selected by the controller 53. In the tuner 52, the television broadcasting signal on the channel selected by the controller 53 is frequency-converted. In the video demodulator 54, an output from the tuner 52 is demodulated, and is output to the RGB processor 55 as a video signal. In the RGB processor 55, the video signal is converted into an RGB signal for driving the display 56, and is output to the display 56. Consequently, a desired video is displayed on the display 56.

On the other hand, the video signal branched from the video demodulator 54 is inputted to the controller 53. In the controller 53, the rating information is extracted from the video signal.

FIG. 30 is a flow chart showing the processing of the controller 53 in the television receiver shown in FIG. 28. The controller 53 accepts packet data composed of 6 bytes, and extracts rating information from the third byte and the fourth byte of the packet data (step S201).

The controller 53 compares a rating represented by the extracted rating information with a rating previously set by the user, to judge whether or not viewing is restricted (step S202). The controller 53 restricts viewing when the set rating is not more than the extracted rating, to display a message on a screen of the display 56, and subjects the RGB processor 55 to muting processing, to set the display 56 to a deep black screen or a blue back screen, for example (step S203). When the set rating is higher than the extracted rating, the controller 53 sets the RGB processor 55 in a muting processing released state without restricting viewing, to display a video of a program on the display 56 (step S204).

In such a way, the rating of a program which a guardian to a child previously considers to be detrimental to mental health or culture of sentiments is set in the controller 53, thereby making it possible to prevent a program having a rating which is not less than the set rating from being displayed.

As described above, the viewing restricting function can be set and released by entering a password. The same is also described in JP-A-2000-354209 and JP-A-2001-16565. The former discloses that a time period during which the viewing restricting function is released is set, and the latter discloses that the viewing restricting function is not released when an external input is a nonstandard signal.

In the above-mentioned conventional television receiver, there is a case where the rating of a program which is broadcast cannot be previously recognized, it is not recognized that the program conforms to the restriction of viewing until the broadcasting of the program is started, and the user cannot view the program.

In a case where the user reserves the viewing of the program using an electronic program guide (EPG) or the like, the rating of a reserved program is not recognized until the program is broadcast in the conventional television receiver. When rating information extracted from a television broadcasting signal is not less than a rating previously set, therefore, the user cannot view the reserved program.

Conventionally, recording was thus unconditionally performed, and viewing was only restricted by the setting of the rating at the time of reproduction. However, there is a disadvantage in that a program whose viewing should be restricted is recorded. In this case, it is difficult to strictly restrict viewing at the time of reproduction. Therefore, it is preferable that the management of the restriction of viewing is unified on the side of the receiver at the time of recording, not to record a program having a rating which is not less than the set rating.

With respect to the ratings of programs which are currently broadcast in the U.S., for example, a television receiver of 13 or more inches is obliged to carry a so-called V-chip function for realizing a viewing restricting function.

However, the conventional television receiver carrying the V-chip function does not compare, until the time point where it receives rating information periodically transmitted in a program which is being currently broadcast, a rating represented by the received rating information with a rating previously set, to restrict viewing when the received rating is not less than the set rating. When the user switches a receiving channel, therefore, the viewing of a program having the rating which is not less than the set rating cannot be restricted until it receives the rating information.

FIG. 31 is a diagram showing in a time series an example of viewing restriction processing. As shown in FIG. 31, rating information R1, R2, R3, . . . , R6 on Channel 10 shall be transmitted in this order. Immediately after the rating information R1 on Channel 10 is transmitted, for example, when the user switches a receiving channel from Channel 8 to Channel 10, viewing is restricted at the time point where the rating information R1 is not accepted and the rating information R2 is accepted. In a time period T1 elapsed from the time point where the channel is switched until the rating information R2 is accepted, therefore, viewing is not restricted, so that a program is displayed. If a sending period of the rating information is five seconds, a program whose viewing is to be restricted is displayed for a maximum of five seconds.

Similarly, in a television receiver having a plurality of external signal input terminals and carrying a V-chip function, the viewing of a program is not restricted even if the program has a rating which is not less than a set rating until rating information is received in the case of switching from input of a plurality of external signals to input of a television broadcasting signal.

Furthermore, a television receiver having a key called a rapid chain (a rapid chain key) has been developed. The user presses the rapid chain key, thereby making it possible to perform an operation for alternately switching a first channel currently received and a second channel received immediately before the rapid chain key is pressed. In the case of the operation, when the rapid chain key is pressed in a predetermined period, each of the channels is switched immediately before rating information is received on the channel so that a V-chip function may, in some cases, be nullified.

DISCLOSURE OF INVENTION

An object of the present invention is to provide a viewing restricting apparatus capable of recognizing whether or not viewing should be restricted before rating information transmitted together with a television broadcasting signal is received, a viewing restricting system, a transmitting device and a viewing restricting program used therefor.

A viewing restricting apparatus according to an aspect of the present invention comprises a receiver that receives a television broadcasting signal, together with first rating information for restricting viewing, and receives electronic program guide information, together with second rating information for restricting viewing; a program output unit that outputs a video or an audio of a program on the basis of the television broadcasting signal received by the receiver; an information holding unit that holds the electronic program guide information received by the receiver; and a controller that extracts the second rating information from the electronic program guide information held by the information holding unit, and restricts the output of the program from the program output unit on the basis of the extracted second rating information.

In the viewing restricting apparatus according to the present invention, the television broadcasting signal, together with the first rating information, is received by the receiver, and the electronic program guide information, together with the second rating information, is received by the receiver. The video or the audio of the program is output from the program output unit on the basis of the received television broadcasting signal. Further, the received electronic program guide information is held by the information holding unit. The second rating information is extracted by the controller from the held electronic program guide information, and the output of the program from the program output unit is restricted on the basis of the extracted second rating information.

The output of the program by the program output unit is thus restricted on the basis of the second rating information extracted from the electronic program guide information. Accordingly, it can be recognized whether or not viewing should be restricted before the first rating information transmitted together with the television broadcasting signal is received. Consequently, a drawback of the program which should be restricted being output at the time when the program is actually broadcast is overcome.

The viewing restricting apparatus may further comprise a rating setting unit that sets the rating of the program whose viewing should be restricted, and the controller may restrict the output of the program from the program output unit on the basis of the rating set from the rating setting unit.

In this case, a user can arbitrarily set the rating of the program whose viewing should be restricted using the rating setting unit.

The program output unit may comprise a video display for displaying a video, and a video signal processor that extracts a video signal from the television broadcasting signal received by the receiver, and displays the video of the program on the video display.

In this case, the display of the video on the video display is restricted on the basis of the second rating information extracted from the electronic program guide information.

The program output unit may comprise an audio output unit for outputting an audio, and an audio signal processor that extracts an audio signal from the television broadcasting signal received by the receiver, and outputs the audio of the program from the audio output unit.

In this case, the output of the audio from the audio output unit is restricted on the basis of the second rating information extracted from the electronic program guide information.

The viewing restricting apparatus may further comprise an electronic program guide display for displaying an electronic program guide on the basis of the electronic program guide information held by the information holding unit.

In this case, the user can select the program which should be output on the basis of the electronic program guide displayed by the electronic program guide information.

The controller may have a program reserving function for reserving the output of the program from the program output unit, and a reservation restricting function for restricting the reservation of the program by the program reserving function on the basis of the second rating information extracted from the electronic program guide information.

In this case, the reservation of the program is restricted on the basis of the second rating information extracted from the electronic program guide information. At the time point of an operation for reserving the program, therefore, it can be recognized whether or not the program can be output. Further, situations where it is not recognized that the program reserved by the user cannot be viewed until the time when the program is actually broadcast are prevented from occurring.

The viewing restricting apparatus may further comprise a reservation possibility/impossibility presenting unit that presents the possibility/impossibility of the reservation by the reservation restricting function.

In this case, the user can easily recognize whether or not the reservation is possible at the time point of the reserving operation.

The viewing restricting apparatus may further comprise a recording reservation commanding unit that commands a recording device to reserve the recording of the video or the audio of the program, and the controller may have a recording reservation restricting function for restricting the command to reserve the recording by the recording reservation commanding unit on the basis of the second rating information extracted from the electronic program guide information.

In this case, the reservation of the recording is restricted at the time point of the operation for reserving recording on the basis of the second rating information. At the time point of an operation for reserving the recording of a program, therefore, it can be recognized whether or not the program can be reserved. Further, situations where the user does not recognize that the program cannot be recorded until the time when the program is actually broadcast are prevented from occurring.

The viewing restricting apparatus may further comprise a recording reservation possibility/impossibility presenting unit that presents the possibility/impossibility of the command to reserve the recording by the recording reservation restricting function.

In this case, the user can easily recognize whether or not the recording can be reserved at the time point of the recording reserving operation.

The second rating information may have the same data structure as that of the first rating information. In this case, the second rating information can be extracted and judged by processing common to the first rating information. Consequently, the configuration of the controller is simplified, and the processing speed is improved. Further, the production of the electronic program guide information, the first rating information, and the second rating information is made efficient.

The controller may have a first information extracting function for extracting the first rating information from the television broadcasting signal received by the receiver, a first output restricting function for restricting the output of the program from the program output unit on the basis of the first rating information extracted by the first information extracting function, a second information extracting function for extracting the second rating information from the electronic program guide information held by the information holding unit, and a second output restricting function for restricting the output of the program by the program output unit on the basis of the second rating information extracted by the second information extracting function, and the first information extracting function, the first output restricting function, the second information extracting function and the second output restricting function may be realized by common software.

In this case, the first information extracting function, the first output restricting function, the second information extracting function, and the second output restricting function are realized by the common software. Accordingly, the amount of processing of the software is reduced, and the processing speed is improved. Further, the burden of the production of the software is reduced, thereby making it easy to eliminate a bug.

The second rating information may be encoded in the electronic program guide information and transmitted.

In this case, the second rating information can be extracted and judged by the processing common to the electronic program guide information, so that the configuration of the controller is simplified, and the processing speed is improved.

The viewing restricting apparatus may further comprise a channel switching unit that switches a receiving channel by the receiver, the controller may extract the second rating information from the electronic program guide information held by the information holding unit in response to the switching of the channel by the channel switching unit, and restrict the output of the program from the program output unit on the basis of the extracted second rating information.

In this case, the output of the program from the program output unit is restricted on the basis of the second rating information when the channel is switched. Accordingly, the program which should be restricted is prevented from being output in a time period elapsed from the time when the channel is switched until the first rating information, together with the television broadcasting signal, is received.

The controller may restrict the output of the program from the program output unit on the basis of the second rating information extracted when the channel is switched by the channel switching unit, and then extract the first rating information from the television broadcasting signal received by the receiver to restrict the output of the program by the program output unit on the basis of the extracted first rating information.

In this case, at the time point where the first rating information, together with the television broadcasting signal, is accepted after the output of the program from the program output unit is restricted on the basis of the second rating information, the output of the program from the program output unit is then restricted on the basis of the first rating information. Even when the change in the electronic program guide information caused by the change in program organization is delayed, therefore, the output of the program is properly restricted on the basis of the first rating information.

The viewing restricting apparatus may further comprise an external input terminal that receives an external signal, and an input switching unit that switches input of the television broadcasting signal received by the receiver and input of the external signal from the external input terminal to feed the television broadcasting signal or the external signal to the program output unit, and the controller may extract the second rating information from the electronic program guide information held by the information holding unit in response to the switching from the input of the external signal to the input of the television broadcasting signal by the input switching unit, and restrict the output of the program from the program output unit on the basis of the extracted second rating information.

In this case, the output of the program from the program output unit is restricted on the basis of the second rating information at the time of switching from the input of the external signal to the input of the television broadcasting signal by the input switching unit. Accordingly, the program which should be restricted is prevented from being output in a time period elapsed from the time when the input is switched by the input switching unit until the first rating information, together with the television broadcasting signal, is received.

The controller may restrict the output of the program by the program output unit on the basis of the second rating information extracted when the input is switched by the input switching unit, and then extract the first rating information from the television broadcasting signal received by the receiver to restrict the output of the program from the program output unit on the basis of the extracted first rating information.

In this case, at the time point where the first rating information transmitted together with the television broadcasting signal is acquired after the output of the program from the program output unit is restricted on the basis of the second rating information when the input is switched by the input switching unit, the output of the program from the program output unit is restricted on the basis of the first rating information. Even when the change in the electronic program guide information caused by the change in program organization is delayed, therefore, the output of the program is properly restricted on the basis of the first rating information.

The channel switching unit may have an alternately switching function for alternately switching for each operation of a predetermined key a channel currently selected and a channel selected immediately before the operation of the predetermined key, and the controller may extract the second rating information from the electronic program guide information held by the information holding unit in response to the switching of the channel by the alternately switching function of the channel switching unit, and restrict the output of the program from the program output unit on the basis of the extracted second rating information.

In this case, the output of the program from the program output unit is restricted on the basis of the second rating information at the time point where the channel is switched by the alternately switching function of the channel switching unit. Consequently, the program which should be restricted is prevented from being output in a time period elapsed from the time when the channel is switched by the alternately switching function of the channel switching unit until the first rating information transmitted together with the television broadcasting signal is received.

The controller may restrict the output of the program from the program output unit on the basis of the second rating information extracted when the channel is switched by the alternately switching function of the channel switching unit, and then extract the first rating information from the television broadcasting signal received by the receiver to restrict the output of the program from the program output unit on the basis of the extracted first rating information.

In this case, at the time point where the first rating information is accepted from the television broadcasting signal after the output of the program from the program output unit is restricted on the basis of the second rating information when the channel is switched by the alternately switching function, the output of the program from the program output unit is restricted on the basis of the first rating information. Even when the change in the electronic program guide information caused by the change in program organization is delayed, therefore, the program which should be restricted is prevented from being output.

A viewing restricting system according to another aspect of the present invention comprises a transmitting device that transmits a television broadcasting signal, together with first rating information for restricting viewing, and transmits electronic program guide information, together with second rating information for restricting viewing; and a receiving device that receives the television broadcasting signal transmitted by the transmitting device, the receiving device comprising a receiver that receives the television broadcasting signal transmitted by the transmitting device, together with the first rating information, and receives the electronic program guide information transmitted by the transmitting device, together with the second rating information, a program output unit that outputs a video or an audio of a program on the basis of the television broadcasting signal received by the receiver, an information holding unit that holds the electronic program guide information received by the receiver, and a controller that extracts the second rating information from the electronic program guide information held by the information holding unit, and restrict the output of the program from the program output unit on the basis of the extracted second rating information.

In the viewing restricting system according to the present invention, the television broadcasting signal, together with the first rating information, is transmitted by the transmitting device, and the electronic program guide information, together with the second rating information, is transmitted by the transmitting device. The television broadcasting signal transmitted by the transmitting device, together with the first rating information, is received by the receiver in the receiving device, and the electronic program guide information transmitted by the transmitting device, together with the second rating information, is received by the receiver in the receiving device. The video or the audio of the program is output by the program output unit on the basis of the received television broadcasting signal, and the received electronic program guide information is held by the information holding unit. The second rating information is extracted from the held electronic program guide information, and the output of the program from the program output unit is restricted on the basis of the second rating information.

In the receiving device, the output of the program from the program output unit is thus restricted on the basis of the second rating information extracted from the electronic program guide information. Accordingly, it can be recognized whether or not viewing should be restricted before the first rating information transmitted together with the television broadcasting signal is received. Consequently, a drawback of the program which should be restricted being output at the time when the program is actually broadcast is overcome.

A transmitting device according to still another aspect of the present invention comprises an information production unit that produces a television broadcasting signal including first rating information for restricting viewing and electronic program guide information including second rating information for restricting viewing, and a transmitter that transmits the television broadcasting signal including the first rating information produced by the information production unit, and transmits the electronic program guide information including the second rating information produced by the information production unit.

In the transmitting device according to the present invention, the television broadcasting signal including the first rating information and the electronic program guide information including the second rating information are produced by the information production unit, the television broadcasting signal including the produced first rating information is transmitted by the transmitter, and the electronic program guide information including the produced second rating information is transmitted by the transmitter.

In the receiving device, therefore, it is possible to output the video or the audio of the program on the basis of the received television broadcasting signal, hold the received electronic program guide information by the information holding unit, extract the second rating information from the held electronic program guide information, and restrict the output of the program on the basis of the second rating information.

In the receiving device, the output of the program from the program output unit can be thus restricted on the basis of the second rating information extracted from the electronic program guide information. Accordingly, it can be recognized whether or not viewing should be restricted before the first rating information transmitted together with the television broadcasting signal is received. Consequently, a drawback of the program which should be restricted being output at the time when the program is actually broadcast is overcome.

A viewing restricting program according to still another aspect of the present invention is a viewing restricting program, which is readable by a computer, for restricting viewing in a television receiver comprising a receiver that receives a television broadcasting signal, together with first rating information for restricting viewing, and receives electronic program guide information, together with second rating information for restricting viewing, and a program output unit that outputs a video or an audio of a program on the basis of the television broadcasting signal received by the receiver, for causing the computer to perform processing for holding the received electronic program guide information; processing for extracting the second rating information from the held electronic program guide information; and processing for restricting the output of the program from the program output unit on the basis of the extracted second rating information.

In the viewing restricting program according to the present invention, the received electronic program guide information is held, the second rating information is extracted from the held electronic program guide information, and the output of the program from the program output unit is restricted on the basis of the extracted second rating information.

The output of the program from the program output unit is thus restricted on the basis of the second rating information extracted from the electronic program guide information. Accordingly, it can be recognized whether or not viewing should be restricted before the first rating information transmitted together with the television broadcasting signal is received. Consequently, a drawback of the program which should be restricted being output at the time when the program is actually broadcast is overcome.

BRIEF DESCRIPTION OF DRAWINGS

FIG. 4 is a diagram showing an example of a viewing restriction setting window;

FIG. 5 is a diagram showing an example of an electronic program guide;

FIG. 6 is a diagram showing an example of a program reservation setting guide;

FIG. 10 is a diagram showing an example of a program recording reservation setting guide;

FIG. 13 is a diagram showing a specific example of a data transmission format of EPG data used in the viewing restricting system shown in FIG. 1;

FIG. 26 is a diagram showing in a time series an example of processing in a ninth embodiment;

FIG. 27 is a diagram showing the contents of a rating;

FIG. 28 is a block diagram showing the configuration of a conventional television receiver comprising a viewing restricting function;

FIG. 29 is a diagram showing a data transmission format of rating information;

BEST MODE FOR CARRYING OUT THE INVENTION

Figure 1:
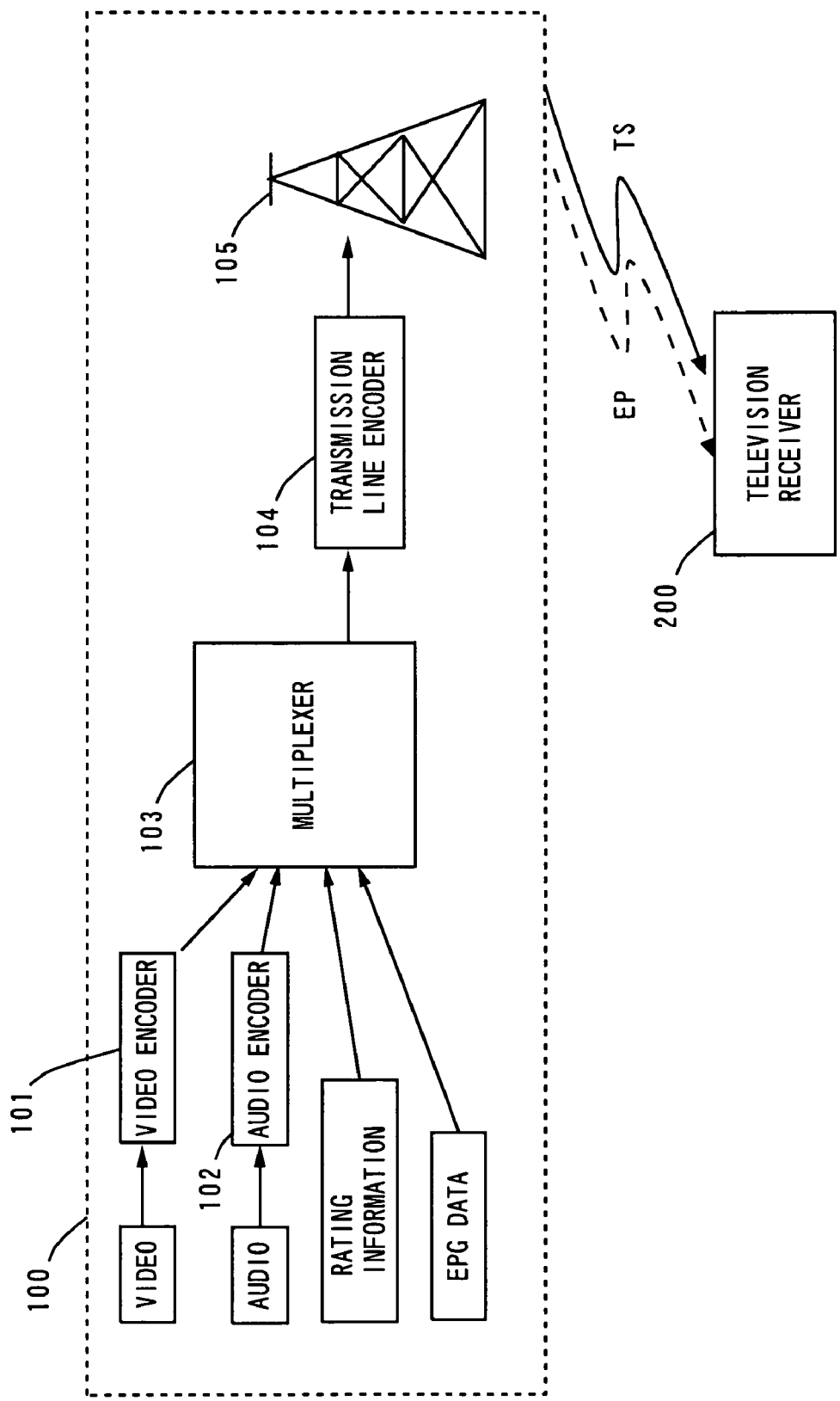
FIG. 1 is a block diagram showing an example of a viewing restricting system according to the present invention.

FIG. 1 is a block diagram showing an example of a viewing restricting system according to the present invention.

The viewing restricting system shown in FIG. 1 comprises a broadcasting station 100 and a television receiver 200.

The restriction of viewing in the present invention not only means the restriction of viewing put on a contractor by a broadcasting station depending on the contents of a contract in paid broadcasting or the like but also puts stress on the restriction of viewing by the rating of a program for the degree of extremity of the program.

The broadcasting station 100 comprises a video encoder 101, an audio encoder 102, a multiplexer 103, and a transmission line encoder 104. The video encoder 101 encodes a video as video data, and the audio encoder 102 encodes an audio as audio data. The multiplexer 103 multiplexes the video data, the audio data, rating information, and EPG (Electronic Program Guide) data, and outputs the multiplexed data as a data stream. The transmission line encoder 104 subjects the data stream output from the multiplexer 103 to error correcting processing and modulation processing, transmits a television broadcasting signal TS from an antenna 105 in real time, and transmits the EPG data EP n times per day as program related data.

The television broadcasting signal comprises a video data stream, an audio data stream, EPG difference data, and rating information related to a program which is being broadcast (hereinafter referred to as first rating information). The EPG data comprises EPG full data corresponding to a plurality of days and rating information corresponding to a plurality of days (hereinafter referred to as second rating information). With respect to the program which is being broadcast, the first rating information and the second rating information coincide with each other. The configuration and the operations of the television receiver 200 will be described later.

Figure 2:
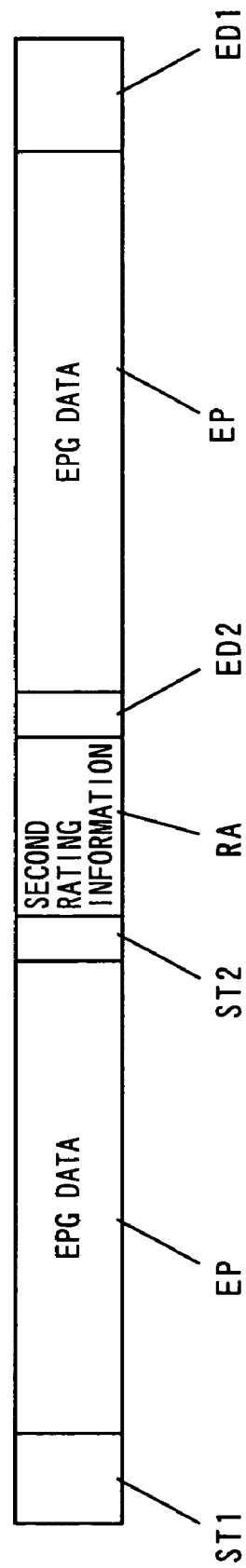
FIG. 2 is a diagram showing an EPG data transmission format.

FIG. 2 is a diagram showing an EPG data transmission format. As shown in FIG. 2, EPG data EP is transmitted between a start code ST1 and an end code ED1. Further, second rating information RA interposed between a start code ST2 and an end code ED2 is transmitted in the form of a packet between the EPG data EP.

When the second rating information is transmitted as text data, software for detecting and extracting the text data is required. The second rating information, together with the EPG data, is encoded and transmitted, as shown in FIG. 2, thereby making it possible to process the second rating information as a part of decoding processing of the EPG data. In the television receiver 200, therefore, the necessity of the software for detecting and extracting the second rating information is eliminated.

In this example, the broadcasting station 100 corresponds to a transmitting device, and the television receiver 200 corresponds to a receiving device. Further, the video encoder 101, the audio encoder 102, and the multiplexer 103 correspond to an information creating unit, and the transmission line encoder 104 and the antenna 105 correspond to a transmitter.

FIRST EMBODIMENT

Figure 3:
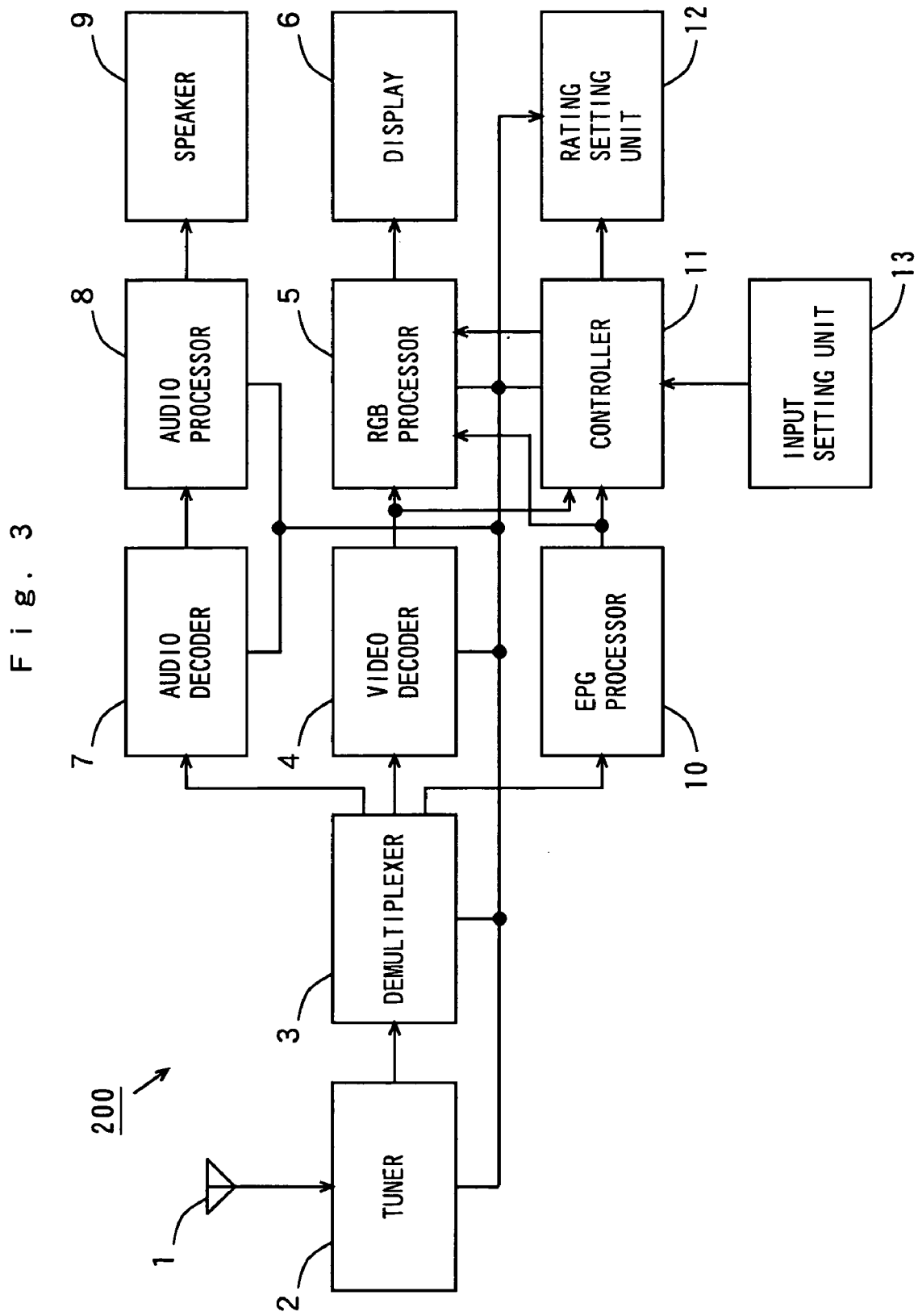
FIG. 3 is a block diagram showing the configuration of a television receiver according to a first embodiment.

FIG. 3 is a block diagram showing the configuration of a television receiver according to a first embodiment. The television receiver shown in FIG. 3 comprises a viewing restricting apparatus.

The television receiver 200 comprises an antenna for television broadcasting 1, a tuner 2, a demultiplexer 3, a video decoder 4, an RGB (Red, Green, Blue) processor 5, a display 6, an audio decoder 7, an audio processor 8, a speaker 9, an EPG processor 10, a controller 11, a rating setting unit 12, and an input setting unit 13.

The controller 11 is constituted by a CPU (Central Processing Unit), a memory, and a viewing restricting program, controls the tuner 2, the demultiplexer 3, the video decoder 4, the RGB processor 5, the audio decoder 7, the audio processor 8, the EPG processor 10 and the rating setting unit 12, and has various types of functions by software processing. The viewing restricting program is recorded on a semiconductor memory such as a ROM (Read-Only Memory) or a nonvolatile memory serving as a recording medium, and the viewing restricting function is realized by executing on a RAM (Random Access Memory) the viewing restricting program read out of the semiconductor memory by the CPU. Here, the CPU corresponds to a computer. A personal computer may be used as the controller 11.

The viewing restricting function may be realized by recording the viewing restricting program on a recording medium such as a hard disk and executing on the RAM the viewing restricting program read out of the recording medium by the CPU. Alternatively, the viewing restricting program may be downloaded through the Internet, for the CPU to execute the downloaded viewing restricting program on the RAM, or the viewing restricting program, together with the television broadcasting signal, may be received, for the CPU to execute the received viewing restricting program on the RAM.

The video decoder 4, the RGB processor 5, the audio decoder 7, the audio processor 8, the EPG processor 10, and the rating setting unit 12 may be constituted by software such as a program and hardware such as a CPU, a memory, or a logical circuit, or may be constituted by only hardware.

The tuner 2 selects a television broadcasting signal on a channel tuned in to by the controller 11 out of television broadcasting signals received by the antenna 1. The demultiplexer 3 separates the television broadcasting signal fed by the tuner 2 into audio data, video data, and EPG data.

The video decoder 4 decodes the video data output from the demultiplexer 3, together with the first rating information. The RGB processor 5 converts the video data decoded by the video decoder 4 into an RGB signal. The display 6 is constituted by a CRT (Cathode-Ray Tube), an LCD (Liquid Crystal Display), or the like, and displays the RGB signal fed from the RGB processor 5 as a video.

The audio decoder 7 decodes the audio data output from the demultiplexer 3. The audio processor 8 subjects the audio data decoded by the audio decoder 7 to predetermined processing, and feeds an audio signal to the speaker 9. The speaker 9 outputs the audio signal as an audio.

The EPG processor 10 decodes the EPG data output from the demultiplexer 3, together with the second rating information, and stores the decoded EPG data. The controller 11 extracts the first rating information from the video data decoded by the video decoder 4, and extracts the second rating information from the EPG data stored by the EPG processor 10.

The input setting unit 13 sets input from a user. For example, the input setting unit 13 decodes an infrared input code from a remote controller. The rating setting unit 12 stores the contents of a basic rating presented in setting the restriction of viewing by the user, and stores the contents of the set viewing restriction.

FIG. 4 is a diagram showing an example of a viewing restriction setting window. In FIG. 4, "TV-Y", "TV-Y7" "TV-G", "TV-PG", "TV-14", and "TV-MA" on the left side respectively represent ratings, and the levels thereof increase in descending order. "YES" or "NO" on the right side is selected, thereby making it possible to set the restriction of viewing.

When the user sets the restriction of viewing, the rating for restricting the viewing of a program by the rating shown in FIG. 27 is set on the viewing restriction setting window shown in FIG. 4 after the contents of the restriction of the viewing are understood in advance. When the rating "TV-Y7" shown in FIG. 4 is set to "NO", for example, the ratings "TV-G", "TV-PG". "TV-14", and "TV-MA" are automatically set to "NO", and the rating "TV-Y" is set to "YES". In this case, the rating "TV-Y7" is stored in the rating setting unit 12. Consequently, a program having the rating "TV-Y7", "TV-G", "TV-PG", "TV-14", or "TV-MA" cannot be viewed, and only a program having the rating "TV-Y" can be viewed.

Specifically, the controller 11 sets outputs of the RGB processor 5 and the audio processor 8 to OFF when the rating of a program on a receiving channel is not less than "TV-Y7". Consequently, the display of a video on the display 6 and the output of an audio by the speaker 9 are subjected to muting processing. Consequently, the user cannot view the program.

FIG. 5 is a diagram showing an example of the electronic program guide. When a request to present the electronic program guide is issued from the input setting unit 13, the electronic program guide shown in FIG. 3 is displayed on the display 6 on the basis of the EPG data from the EPG processor 10.

FIG. 6 is a diagram showing an example of a program reservation setting guide. On the program reservation setting guide, the title of a program selected by a reserving operation from the electronic program guide shown in FIG. 5 by the user, the time when the program is broadcast, a channel on which the program is broadcast, and the possibility/impossibility of the reservation of the program by the restriction of viewing are displayed.

Figure 7:
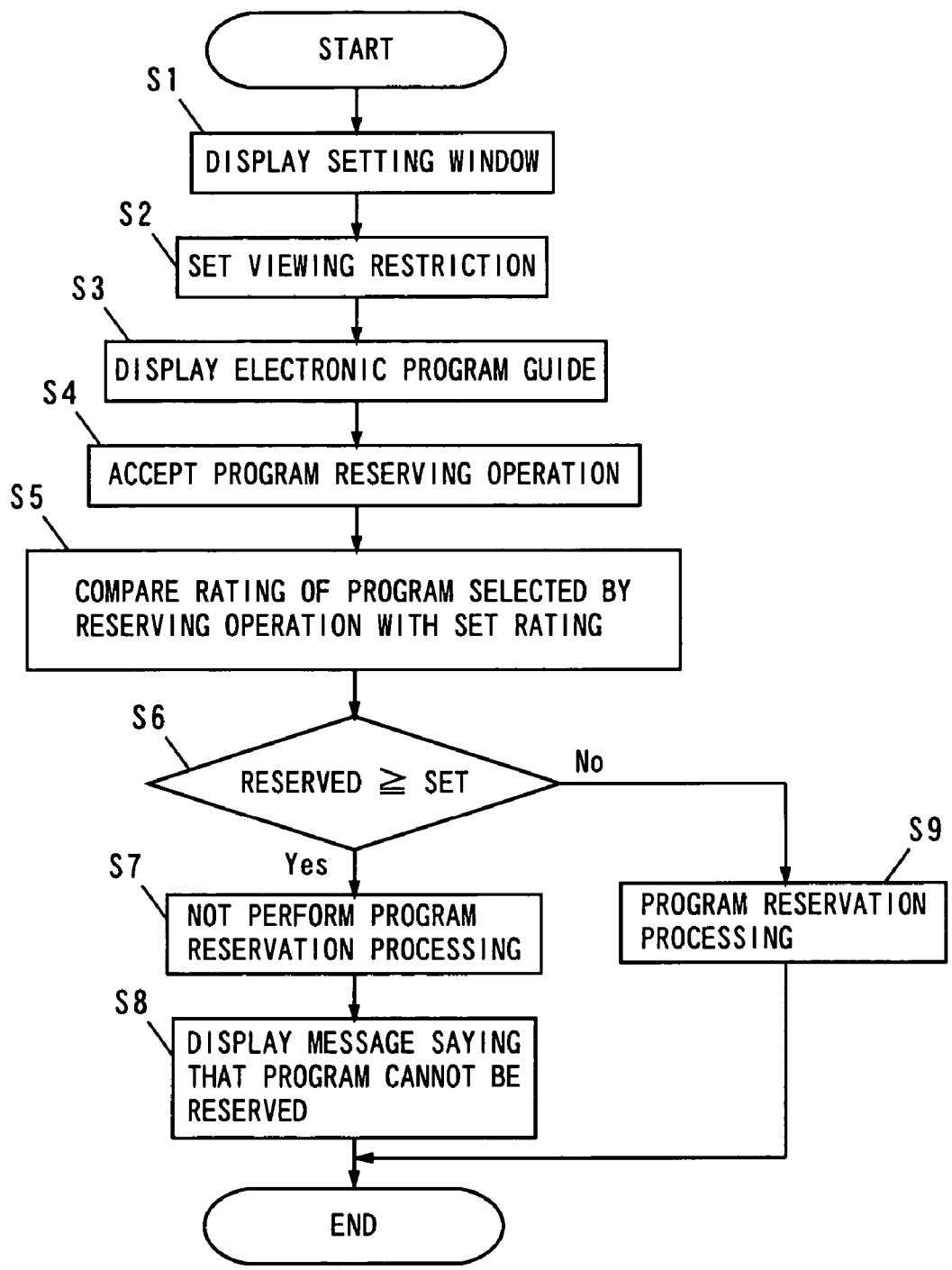
FIG. 7 is a flow chart showing the operation of a controller from the setting of the restriction of viewing to the setting of the reservation of a program.

FIG. 7 is a flow chart showing the operations of the controller 11 from the setting of the restriction of viewing to the setting of the reservation of a program.

The controller 11 first displays the rating setting window shown in FIG. 4 on the display 6 in accordance with a request from the input setting unit 13 (step S1). The controller 11 then sets the rating in the rating setting unit 12 in accordance with the setting of the restriction of viewing by the user (step S2).

The controller 11 displays the electronic program guide shown in FIG. 5 on the display 6 in accordance with a request from the user (step S3). The user performs an operation for reserving a program using the electronic program guide. The controller 11 accepts the program reserving operation by the user (step S4).

The controller 11 then extracts the second rating information from the EPG data stored in the EPG processor 10 and reads out contents set by the rating setting unit 12, compares the rating of the program selected by the reserving operation with the set rating (step S5), and judges whether or not the rating of the program selected by the reserving operation is not less than the set rating (step S6).

When the rating of the program selected by the reserving operation is not less than the set rating, the controller 11 does not perform program reservation processing (step S7), and displays a message saying that the program cannot be reserved on the program reservation setting guide shown in FIG. 6 (step S8). When the rating of the program selected by the reserving operation is lower than the set rating, the controller 11 performs the program reservation processing (step S9).

When the user attempts to reserve a suspense series beginning at 22 o'clock on Channel TV-BS1 from the electronic program guide shown in FIG. 5, the program reservation setting guide shown in FIG. 6 is displayed on the display 6. The program includes a scene of murder, for example, and shall have the rating "TV-14". Since the rating for restricting viewing is set to "TV-Y", as described above, the reservation of the program is nullified.

In such a way, the user gives up reserving the program when a child is awake at the reserved time. Alternatively, the user can reserve the program by resetting the rating for restricting viewing to "TV-MA" when the child is sleeping at the reserved time.

Figure 8:
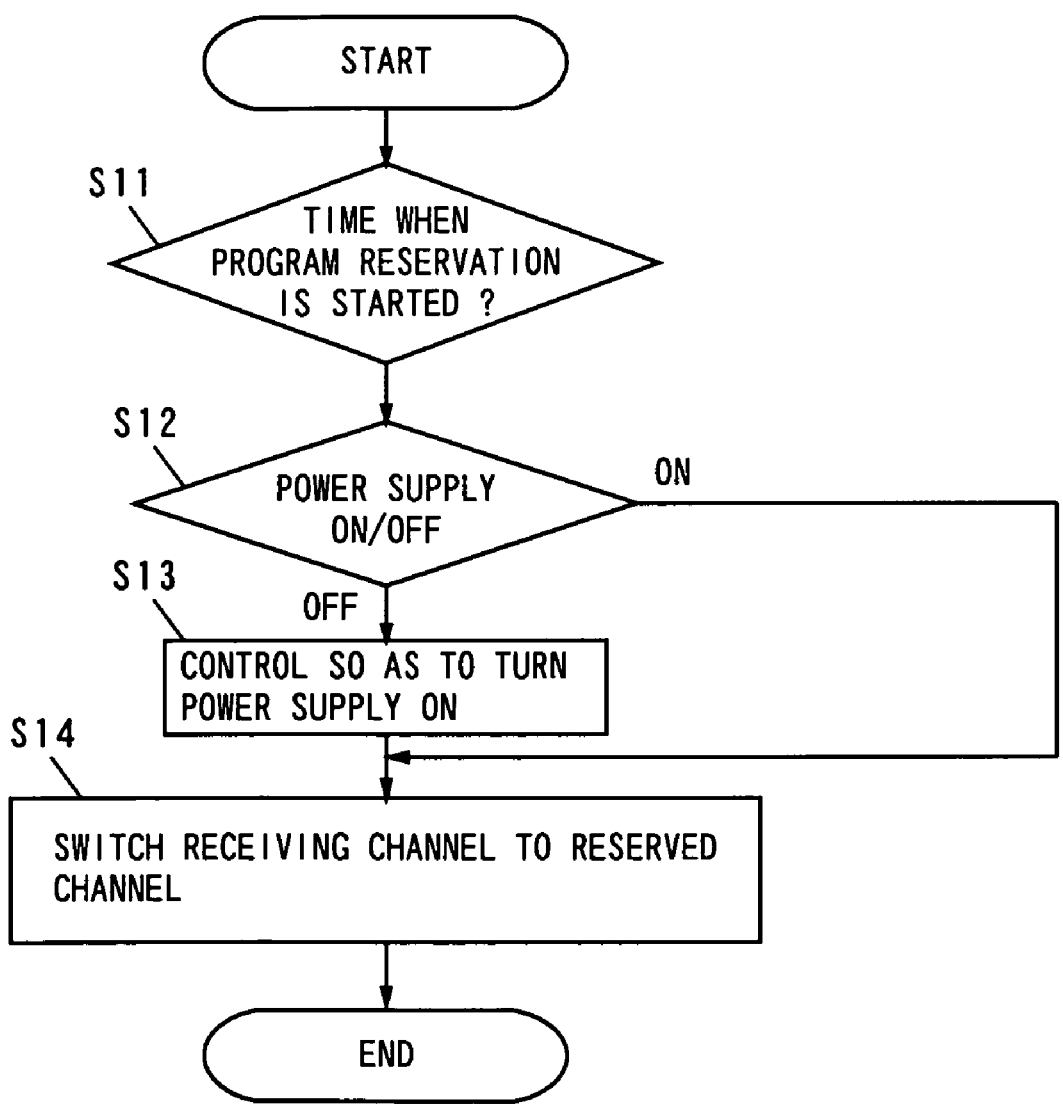
FIG. 8 is a flow chart showing the operations of a controller at the time when the reservation of a program is started.

FIG. 8 is a flow chart showing the operations of the controller 11 at the time when the reservation of a program is started.

The controller 11 judges whether or not the current time is the time when the reservation of the program is started (step S11). When the current time is the time when the reservation of the program is started, the controller 11 judges whether the power supply is turned on or off (step S12). When the power supply is turned off, the controller 11 carries out control so as to turn the power supply on (step S13). Thereafter, the controller 11 switches a receiving channel to a reserved channel (step S14).

When a business news beginning at 21 o'clock on Channel TV-BS1 shown in FIG. 5 is reserved in advance, for example, the reserved program is received at 21 o'clock on the air date.

In the present embodiment, the antenna 1 and the tuner 2 correspond to a receiver, the demultiplexer 3, the video decoder 4, the RGB processor 5, the display 6, the audio decoder 7, the audio processor 8, and the speaker 9 constitute a program output unit, the EPG processor 10 corresponds to an information processor, and the controller 11 corresponds to a controller. Further, the rating setting unit 12 corresponds to a rating setting unit.

Furthermore, the display 6 corresponds to a video display, the video decoder 4 and the RGB processor 5 correspond to a video signal processor, the speaker 9 corresponds to an audio output unit, and the audio decoder 7 and the audio processor 8 correspond to an audio signal processor. Further, the RGB processor 5, the display 6, and the EPG processor 10 constitute an electronic program guide display. Further, a program reserving function and a reservation restricting function are realized by the controller 11, and the RGB processor 5, the display 6, and the controller 11 correspond to a reservation possibility/impossibility presenting unit.

SECOND EMBODIMENT

Figure 9:
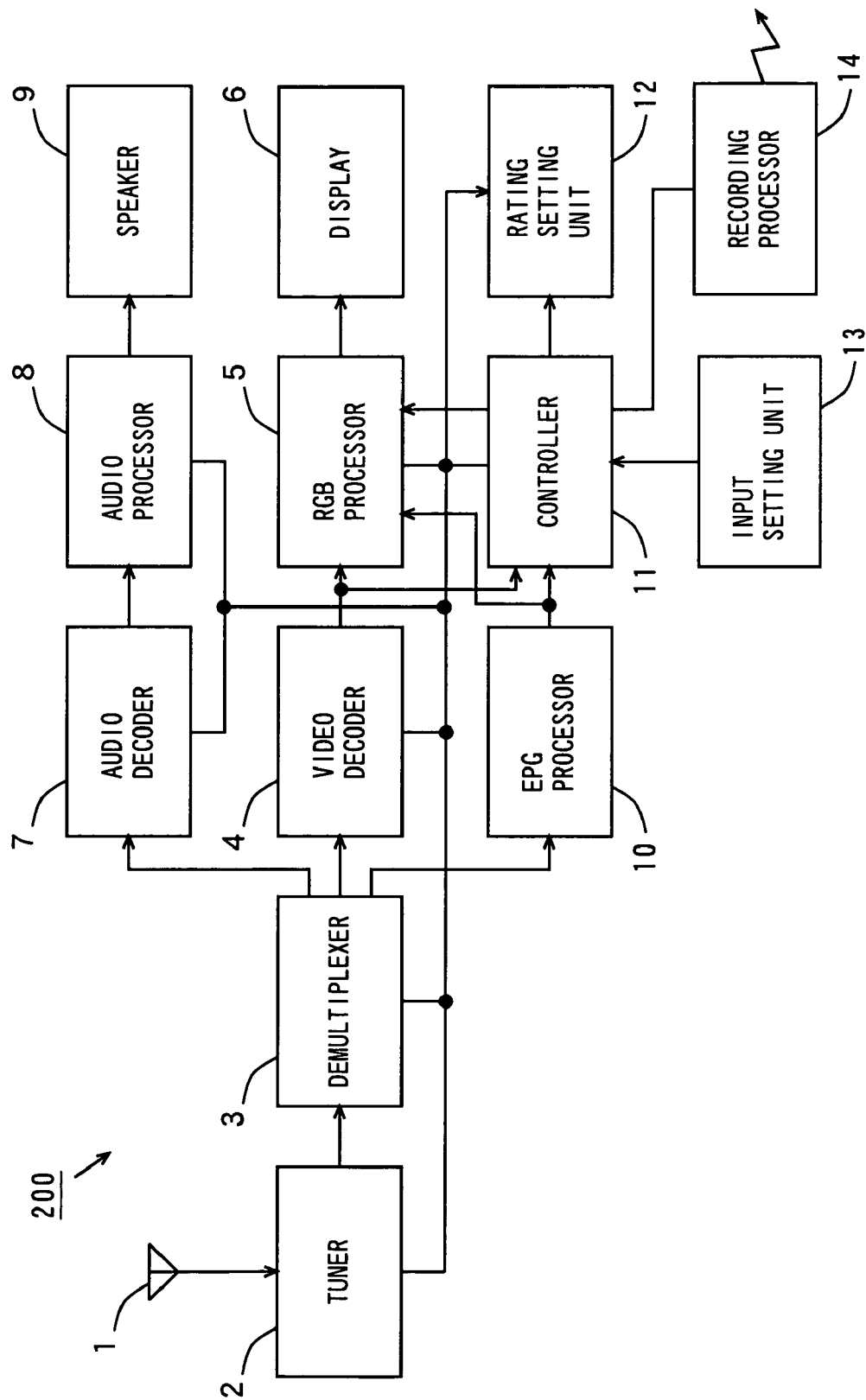
FIG. 9 is a block diagram showing the configuration of a television receiver according to a second embodiment.

FIG. 9 is a block diagram showing the configuration of a television receiver according to a second embodiment.

The television receiver 200 shown in FIG. 9 differs from the television receiver 200 shown in FIG. 3 in that a controller 11 further has the following function, and a recording processor 14 is further provided.

The recording processor 14 has the function of a so-called IR blaster in order to perform recording by a recording device such as a VTR (Video Tape Recorder) (not shown). The IR blaster generates the same infrared remote control code as an infrared remote control code generated from an infrared remote control for controlling the recording device such as the VTR.

FIG. 10 is a diagram showing an example of a program recording reservation setting guide. On the program recording reservation setting guide, the title of a program selected by a recording reserving operation from the electronic program guide shown in FIG. 5 by the user, the time when the program is broadcast, a channel on which the program is broadcast, and the possibility/impossibility of the reservation of the recording of the program by the restriction of viewing are displayed.

Figure 11:
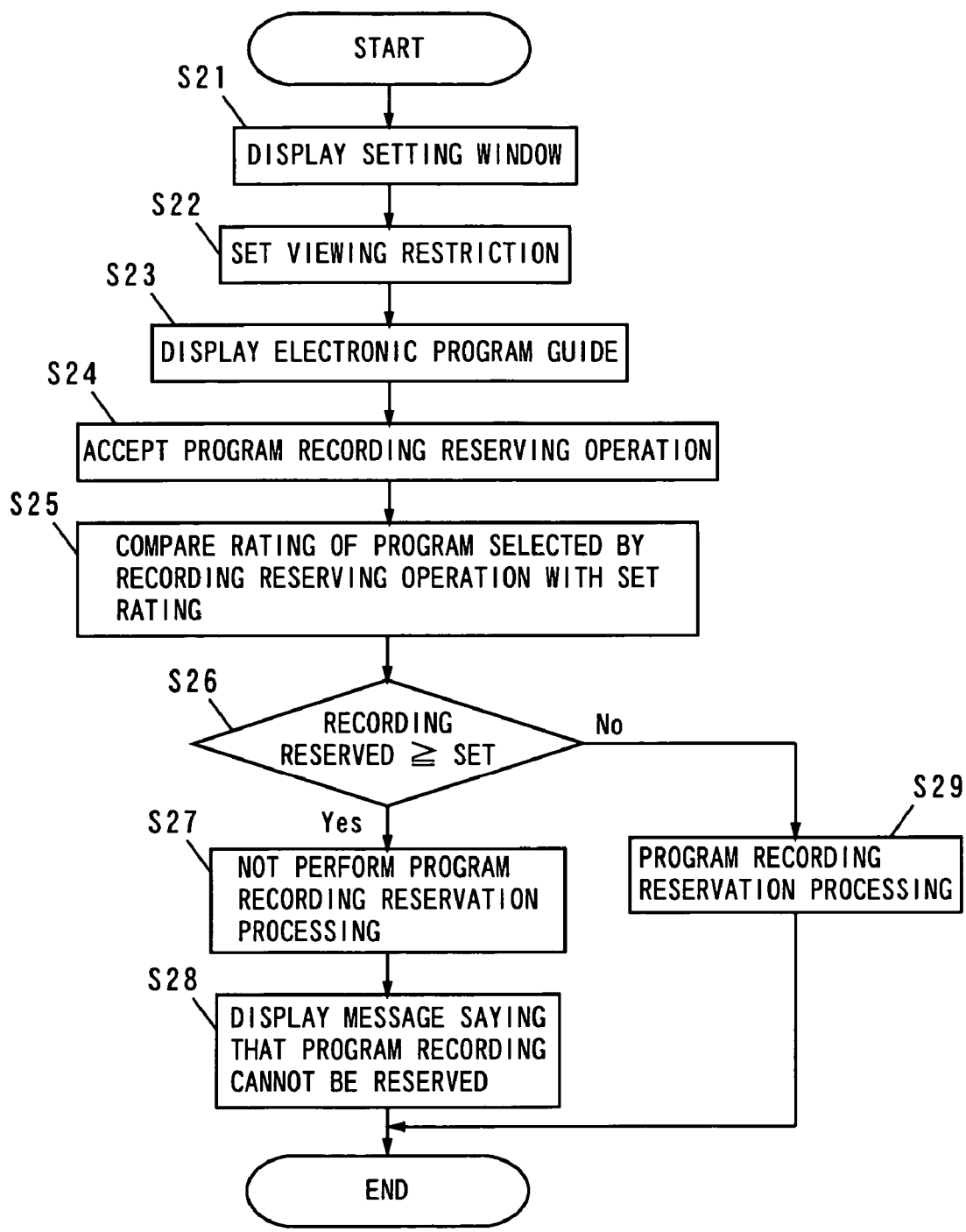
FIG. 11 is a flow chart showing the operations of a controller from the setting of the restriction of viewing to the setting of the reservation of the recording of a program.

FIG. 11 is a flow chart showing the operations of the controller 11 from the setting of the restriction of viewing to the setting of the reservation of the recording of a program.

The controller 11 first displays the rating setting window shown in FIG. 4 on the display 6 in accordance with a request from the input setting unit 13 (step S2). The controller 11 then sets the rating in the rating setting unit 12 in accordance with the setting of the restriction of viewing by the user (step S22).

The controller 11 displays the electronic program guide shown in FIG. 6 on the display 6 in accordance with a request from the user (step S23). The user performs an operation for reserving a program using the electronic program guide. The controller 11 accepts the program recording reserving operation by the user (step S24).

The controller 11 then extracts the rating information from the EPG data stored in the EPG processor 10 and reads out contents set by the rating setting unit 12, compares the rating of the program selected by the recording reserving operation with the set rating (step S25), and judges whether or not the rating of the program selected by the recording reserving operation is not less than the set rating (step S26).

When the rating of the program selected by the recording reserving operation is not less than the set rating, the controller 11 does not perform program recording reservation processing (step S27), and displays a message saying that the recording of the program cannot be reserved on the program recording reservation setting guide shown in FIG. 10 (step S28). When the rating of the program selected by the recording reserving operation is lower than the set rating, the controller 11 performs program recording reservation processing (step S29).

When the user attempts to reserve a suspense series beginning at 22 o'clock on Channel TV-BS1 from the electronic program guide shown in FIG. 5, the program recording reservation setting guide shown in FIG. 10 is displayed on the display 6. The program includes a scene of murder, for example, and shall have the rating "TV-14". Since the rating for restricting viewing is set to "TV-Y", as described above, the reservation of the recording of the program is nullified.

In such a way, the user gives up reserving the recording of the program when a child is awake at the reserved time. Alternatively, the user can reserve the recording of the program by resetting the rating for restricting viewing to "TV-MA" when the child is sleeping at the reserved time.

Figure 12:
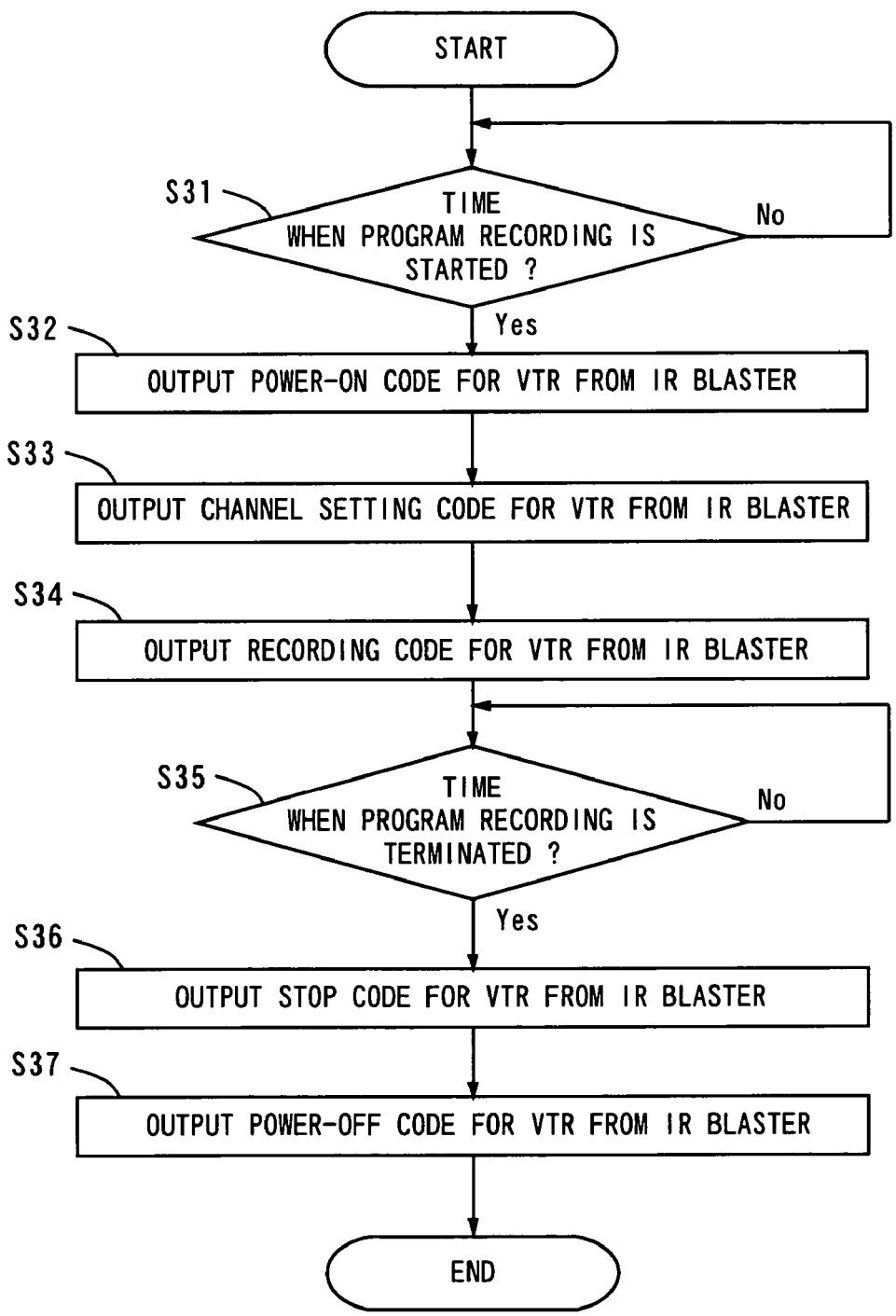
FIG. 12 is a flow chart showing the processing of a controller by the reservation of the recording of a program.

FIG. 12 is a flow chart showing the operations of the controller 11 by reserving the recording of a program.

The controller 11 judges whether or not the current time is the time when the recording of the program is started (step S31). When the current time is the time when the recording of the program is started, the controller 11 outputs from an IR blaster a power-on code for turning the power supply to the VTR on (step S32), outputs from the IR blaster a channel setting code for setting a channel of the VTR (step S33), and outputs from the IR blaster a recording code for starting the recording by the VTR (step S34).

When the recording of a business news beginning at 21 o'clock on Channel TV-BS1 shown in FIG. 5 is reserved in advance, for example, the recording of the program whose recording is reserved by the VTR is started at 21 o'clock on the air date.

The controller 11 judges whether or not the current time is the time when the recording of the program is terminated (step S35). When the current time is the time when the recording of the program is terminated, the controller 11 outputs from the IR blaster a stop code for stopping the recording by the VTR (step S36), and outputs from the IR blaster a power-off code for turning the power supply to the VTR off (step S37).

In the above-mentioned example, the recording of the program by the VTR is terminated at 22 o'clock which is the time when the program is terminated.

In the present embodiment, a program reserving function and a program restricting function are realized by the controller 11 and the recording processor 14. Further, the controller 11 and the recording processor 14 correspond to a recording reservation commanding unit, and the RGB processor 5, the display 6, and the controller 11 correspond to a recording reservation possibility/impossibility presenting unit.

THIRD EMBODIMENT

The configuration of a television receiver according to a third embodiment is the same as the configuration of the television receiver 20 shown in FIG. 3 or 9. In the present embodiment, a controller 11 performs processing for extracting and judging second rating information in the following method.

FIG. 13 is a diagram showing a specific example of a data transmission format of EPG data used in the viewing restricting system shown in FIG. 1.

As described above, the first EPG data to the n-th EPG data are transmitted from a broadcasting station 100 in a predetermined period for a day.

The second rating information is set in the same format as that of rating information corresponding to two bytes in the data transmission format shown in FIG. 29 in No. 58 and No. 59 in each of the EPG data shown in FIG. 13. The EPG processor 10 shown in FIGS. 3 and 9 stores as a data base EPG data including the second rating information corresponding to one to two weeks.

The first rating information transmitted in an arbitrary period at the time of broadcasting a program, together with a television broadcasting signal, and second rating information transmitted before the time when the program is actually broadcast, together with EPG data, have the same data format. Therefore, the creation of the first rating information and the second rating information are made efficient. Processing for extracting the first rating information and the second rating information and processing for judging a rating can be performed by common routine processing on software.

Figure 14:
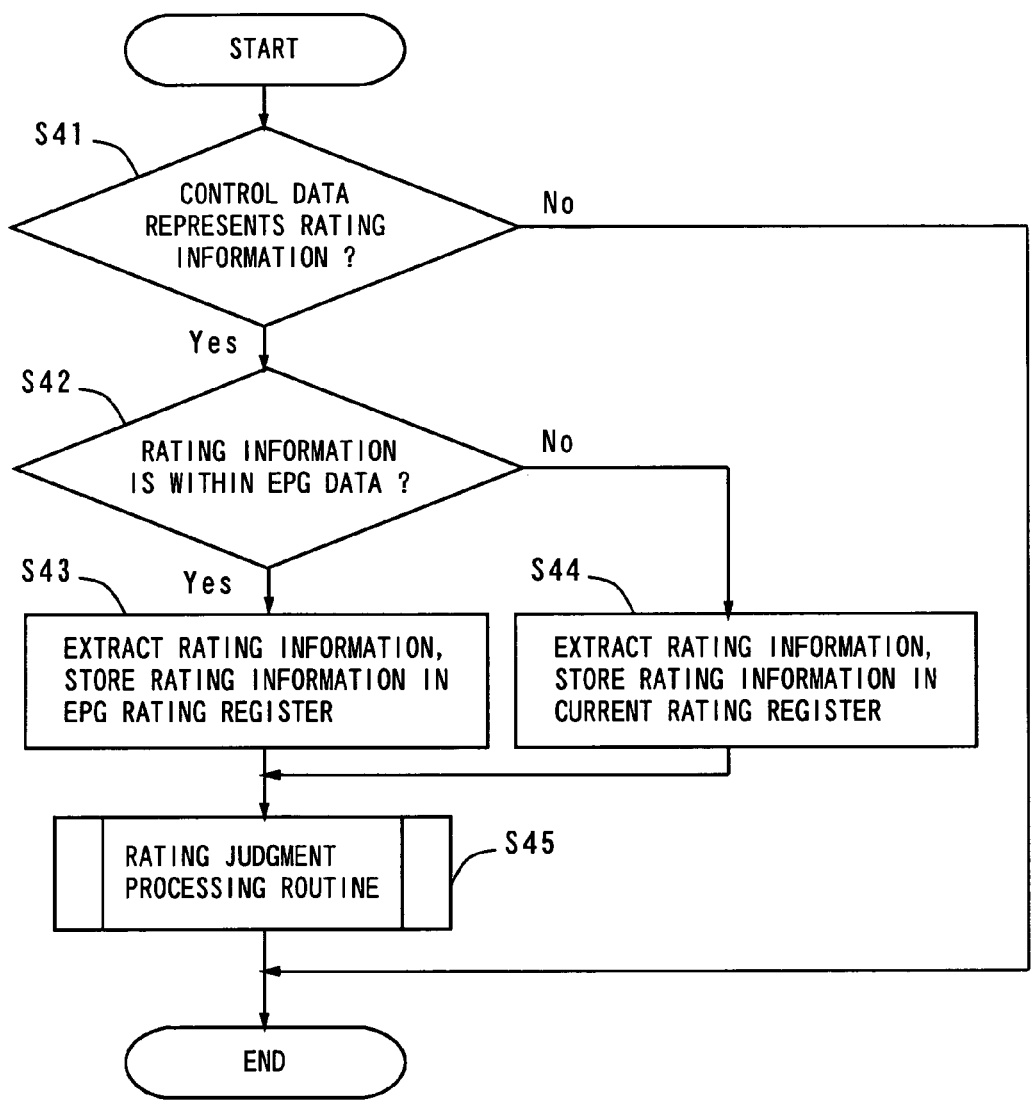
FIG. 14 is a flow chart showing processing for extracting and judging rating information by controllers shown in FIGS. 3 and 9.

FIG. 14 is a flow chart showing the processing for extracting and judging the rating information by the controller 11 shown in FIGS. 3 and 9. Here, the controller 11 has a current rating register for storing the first rating information and an EPG rating register for storing the second rating information.

The controller 11 judges whether or not a control code represents rating information (step S41). When the control code represents rating information, it is judged whether or not the rating information is within EPG data (step S42). When the rating information is within the EPG data, the controller 11 extracts the rating information, and stores the extracted rating information in the EPG rating register as second rating information (step S43). When the rating in formation is packet data transmitted together with the television broadcasting signal, the controller 11 extracts the rating information, and stores the extracted rating information in the current rating register as first rating information (step S44). Thereafter, the controller 11 performs a rating judgment processing routine (step S45).

The processing for judging the first rating information and the second rating information can be thus performed by the common processing routine. Accordingly, the processing capacity of software in the controller 11 is reduced, and the processing speed is improved. Further, the burden of the production of software is reduced, thereby making it easy to eliminate a bug.

In the present embodiment, a first information extracting function, a first output restricting function, a second information extracting function, and a second output control function are realized by the controller 11.

FOURTH EMBODIMENT

The configuration of a television receiver according to a fourth embodiment of the present invention is the same as the configuration of the television receiver 200 show in FIG. 1 or 3. The television receiver according to the present embodiment differs from the television receivers according to the first to third embodiments in that a controller 11 further has the following function. The other operations of the television receiver according to the present embodiment are the same as the operations of the television receivers according to the first to third embodiments.

Figure 15:
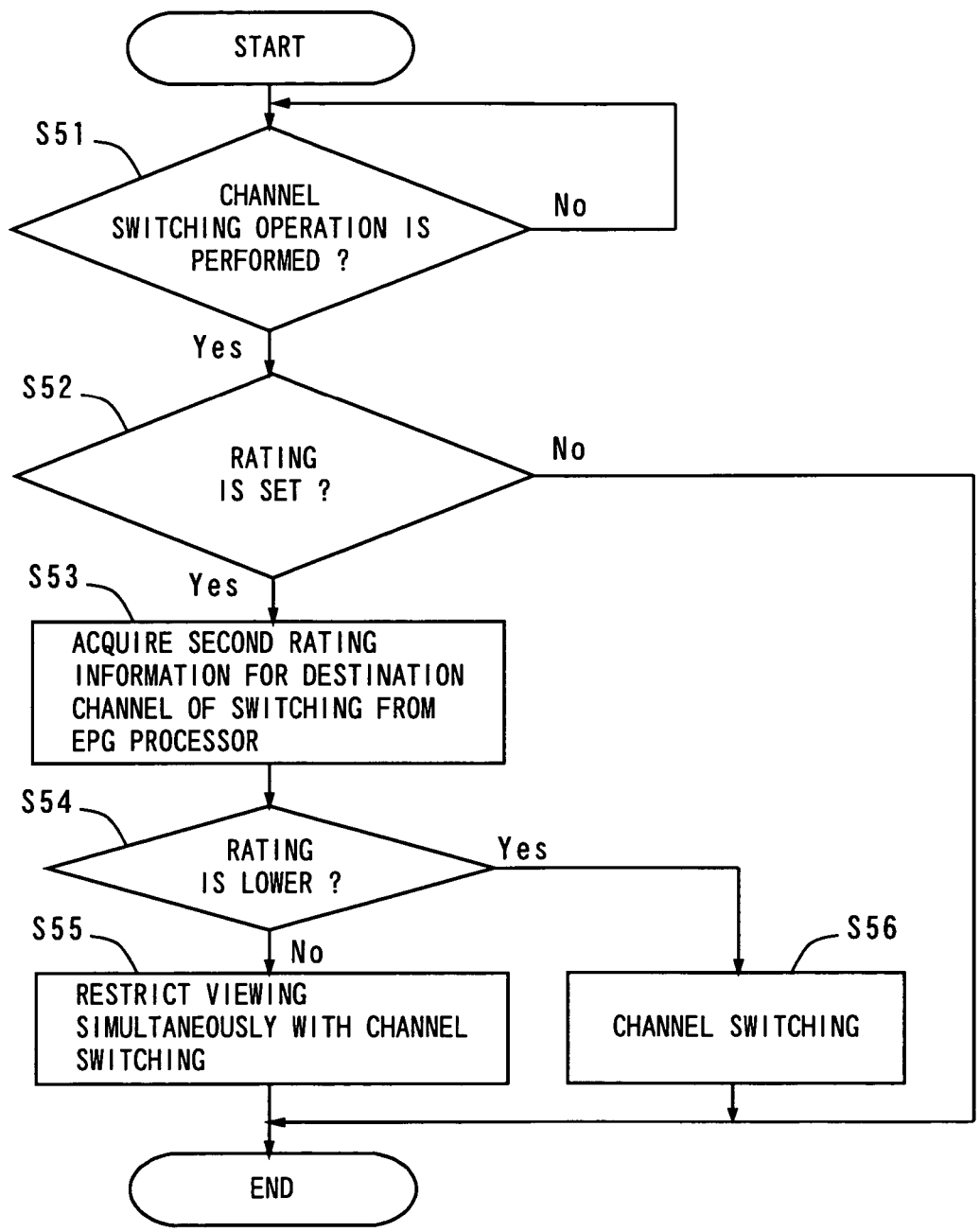
FIG. 15 is a flow chart showing the operations of a controller at the time of channel switching.

FIG. 15 is a flow chart showing the operations of the controller 11 at the time of channel switching.

The controller 11 first judges whether or not a channel switching operation is performed (step S51). When the channel switching operation is performed, the controller 11 judges whether or not a rating is set by a rating setting unit 12 (step S52). When the rating is set, the controller 11 acquires second rating information on a destination channel of switching from an EPG processor 10 (step S53).

The controller 11 then judges whether or not a rating represented by the acquired second rating information is lower than the rating set in the rating setting unit 12 (step S54). When the rating represented by the second rating information is not less than the set rating, the controller 11 restricts viewing simultaneously with the channel switching (step S55). When the rating represented by the second rating information is lower than the set rating, the controller 11 performs channel switching without restricting viewing (step S56).

Figure 16:
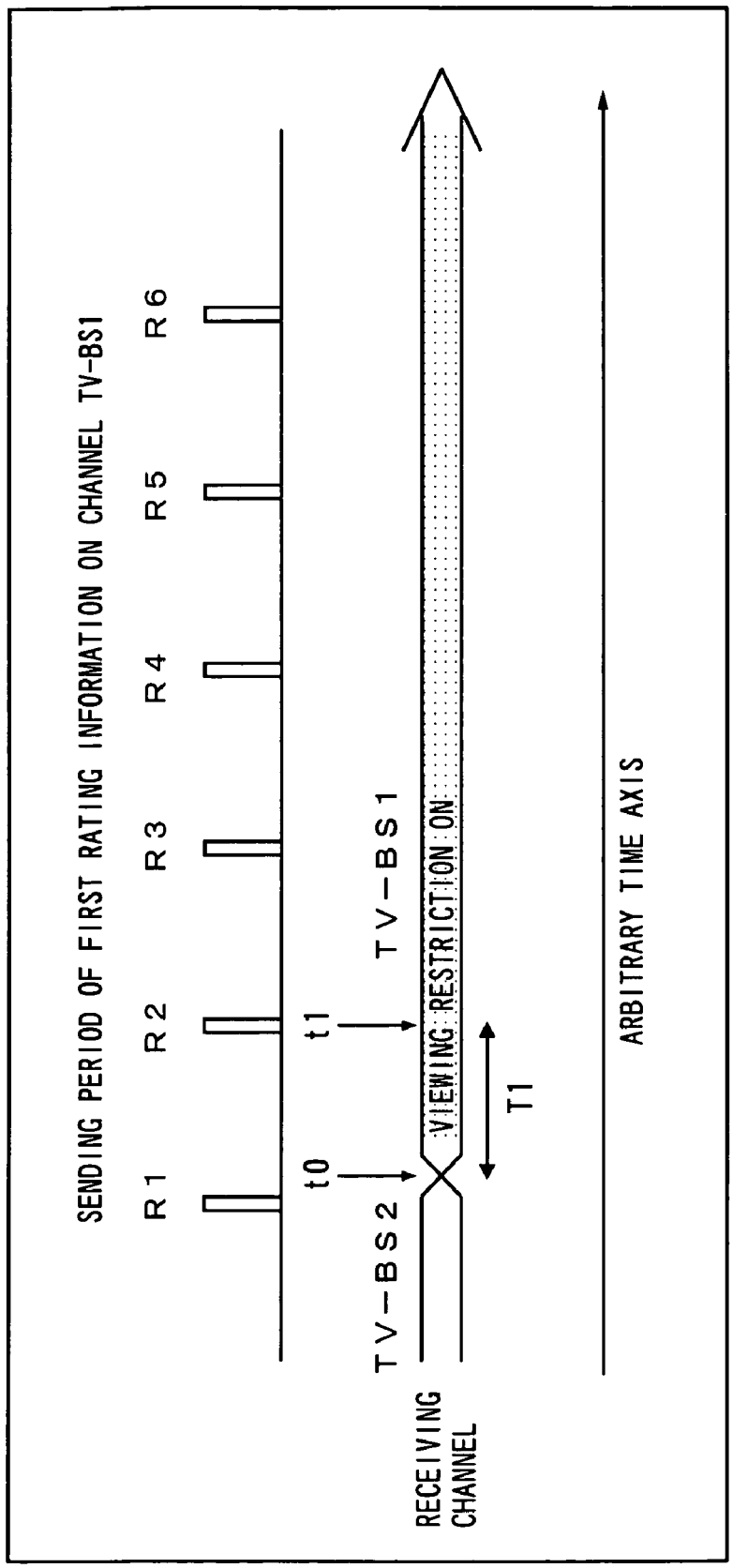
FIG. 16 is a diagram showing in a time series an example of processing in a fourth embodiment.

FIG. 16 is a diagram showing in a time series an example of processing in the fourth embodiment. As shown in FIG. 16, first rating information R1, R2, R3, . . . , R6 on Channel TV-BS, together with a television broadcasting signal, shall be transmitted. In a case where a user switches a receiving channel from Channel TV-BS2 to Channel TV-BS1 at the time point to immediately after transmitting the rating information R1 on Channel TV-BS1, the first rating information R1 is not acquired. In the present embodiment, viewing is restricted from the time point t0 where the channel is switched on the basis of second rating information included in EPG data. Therefore, viewing is also restricted in a time period T1 elapsed from the time point t0 where the channel is switched until the first rating information R2 is acquired, so that a program is not displayed.

It is herein assumed that the rating is set to "TV-Y7" by the rating setting unit 12. Further, it is assumed that the ratings of a program "Business News" on Channel TV-BS1 and a program "Wimbledon Tennis" on Channel TV-BS2 are "TV-Y", and the rating of a program "Suspense Series" on Channel TV-BS1 is "TV-14".

Also in the present embodiment, when the controller 11 receives a request to present an electronic program guide from an input setting unit 13, an EPG processor 10 displays the electronic program guide shown in FIG. 5 on a display 6. When a user performs an operation for switching the receiving channel from Channel TV-BS2 on which the program "Wimbledon Tennis" is being broadcast to Channel TV-BS1 on which the program "Business News" is being broadcast at the current time 21:10, as indicated in FIG. 5, viewing is not restricted so that the program "Business News" on Channel "TV-BS1" is displayed on the display 6 because the rating "TV-V7" set by the rating setting unit 12 is higher than the rating "TV-Y" of the program "Business News".

When the user performs the same channel switching at 22 o'clock and later, viewing is immediately restricted on the basis of the second rating information so that the program "Suspense Series" on Channel TV-BS1 is not displayed on the display 6 because the rating "TV-Y7" set by the rating setting unit 12 is lower than the rating "TV-14" of the program "Suspense Series" which is being broadcast on a destination channel of switching.

In such a way, such a drawback that viewing is not restricted in a time period elapsed from the time when the receiving channel is switched until the first rating information transmitted together with the television broadcasting signal on Channel TV-BS1 is acquired is overcome.

In the present embodiment, the tuner 2 and the input setting unit 13 correspond to a channel switching unit.

FIFTH EMBODIMENT

The configuration of a television receiver according to a fifth embodiment of the present invention is the same as the configuration of the television receiver 200 show in FIG. 1 or 3. In the television receiver according to the present embodiment, a controller 11 further performs the following operations in addition to the operations in the fourth embodiment. The other operations of the television receiver according to the present embodiment are the same as the operations of the television receivers according to the first to third embodiments.

Figure 17:
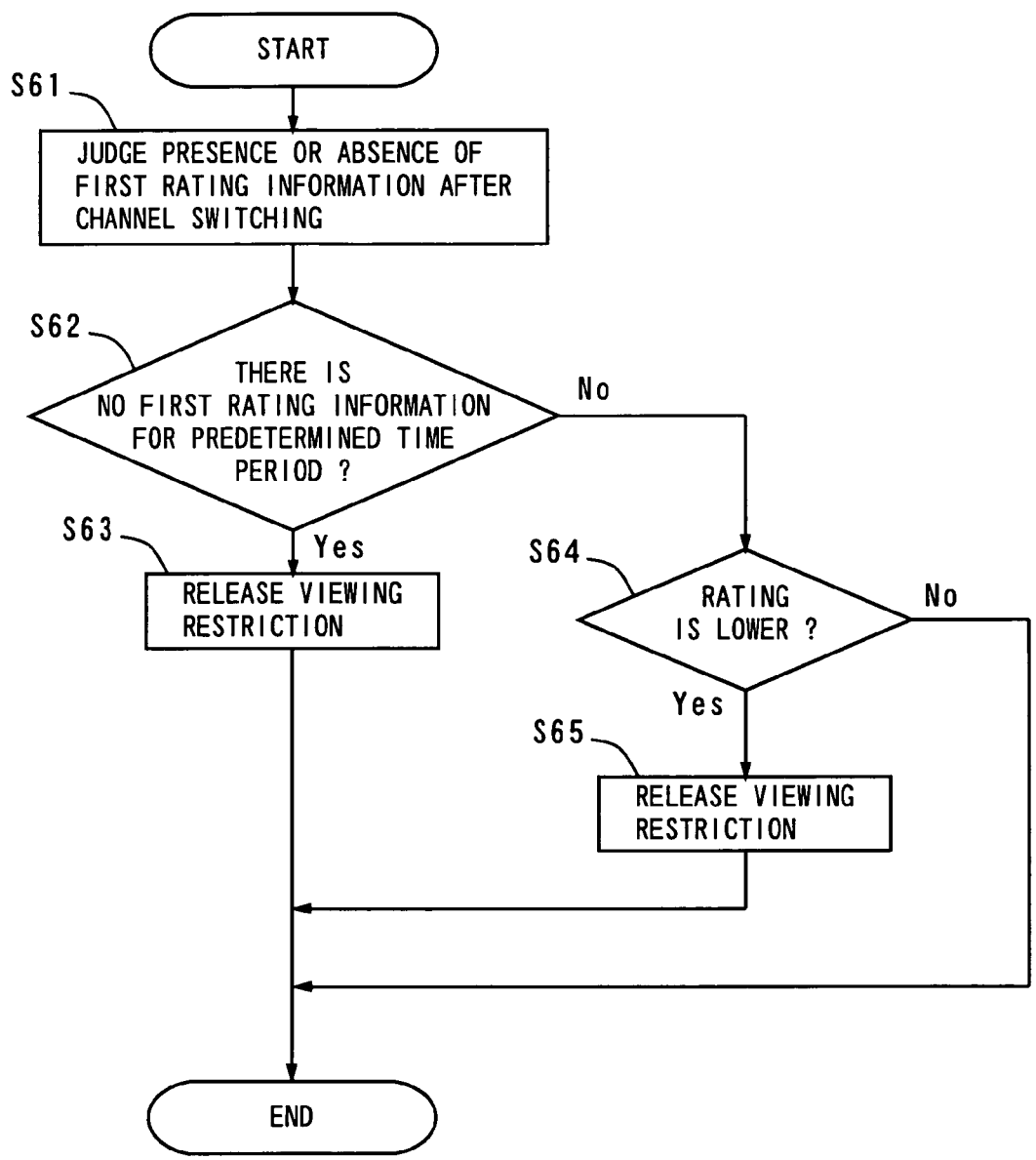
FIG. 17 is a flow chart showing the operations of a controller after channel switching.

FIG. 17 is a flow chart showing the operations of the controller 11 after channel switching.

The controller 11 first judges the presence or absence of first rating information transmitted together with a television broadcasting signal after channel switching (step S61). It is judged whether or not there is first rating information for a predetermined time period (step S62).

When there is no first rating information for a predetermined time period, the controller 11 releases the restriction of viewing (step S63). When the first rating information is acquired within the predetermined time period, the controller 11 judges whether or not a rating represented by the acquired first rating information is lower than a rating set by a rating setting unit 12 (step S64). When the rating represented by the first rating information is lower than the set rating, the controller 11 releases the restriction of viewing (step S65). When the rating represented by the first rating information is not less than the set rating, the controller 11 continues the restriction of viewing.

Figure 18:
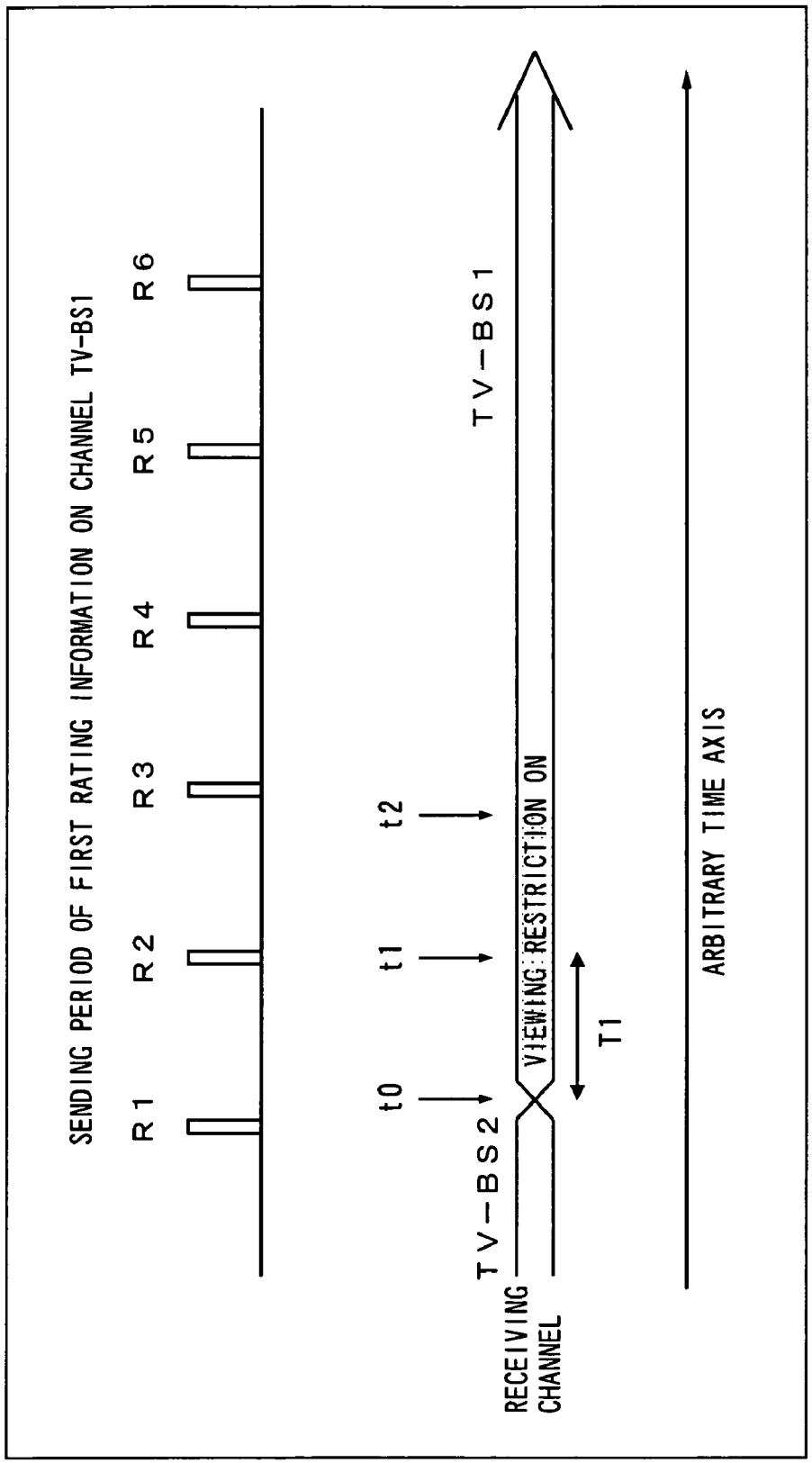
FIG. 18 is a diagram showing in a time series an example of processing in a fifth embodiment.

FIG. 18 is a diagram showing in a time series an example of processing in the fifth embodiment. As shown in FIG. 18, first rating information R1, R2, R3, . . . , R6 on Channel TV-BS1, together with a television broadcasting signal, shall be transmitted. In a case where a user switches a receiving channel from Channel TV-BS2 to Channel TV-BS1 at a time point to immediately after transmitting the rating information R1 on Channel TV-BS1, the first rating information R1 is not acquired. In the present embodiment, viewing is restricted from the time point t0 where the channel is switched on the basis of second rating information included in EPG data. Therefore, viewing is also restricted in a time period T1 elapsed from the time point t0 where the channel is switched until the first rating information R2 is acquired, so that a program is not displayed.

Thereafter, the first rating information R2 on Channel TV-BS1 is acquired at the time point t1. When the rating represented by the first rating information R2 is lower than the set rating, the restriction of viewing is released.

When the first rating information is not acquired from the time point t0 where the channel is switched to a time point t2 after an elapse of a predetermined time period therefrom, the restriction of viewing is released.

When program organization is changed, the correction of the EPG data is not in time for the broadcasting of the program. Therefore, there occur situations where the second rating information included in the EPG data does not coincide with the rating of the program which is actually broadcast. In the present embodiment, the rating of the program which is actually broadcast can be properly judged on the basis of the first rating information included in the television broadcasting signal received after the receiving channel is switched.

When the first rating information included in the television broadcasting signal is not acquired for not less than a predetermined time period, the restriction of viewing is released.

SIXTH EMBODIMENT

Figure 19:
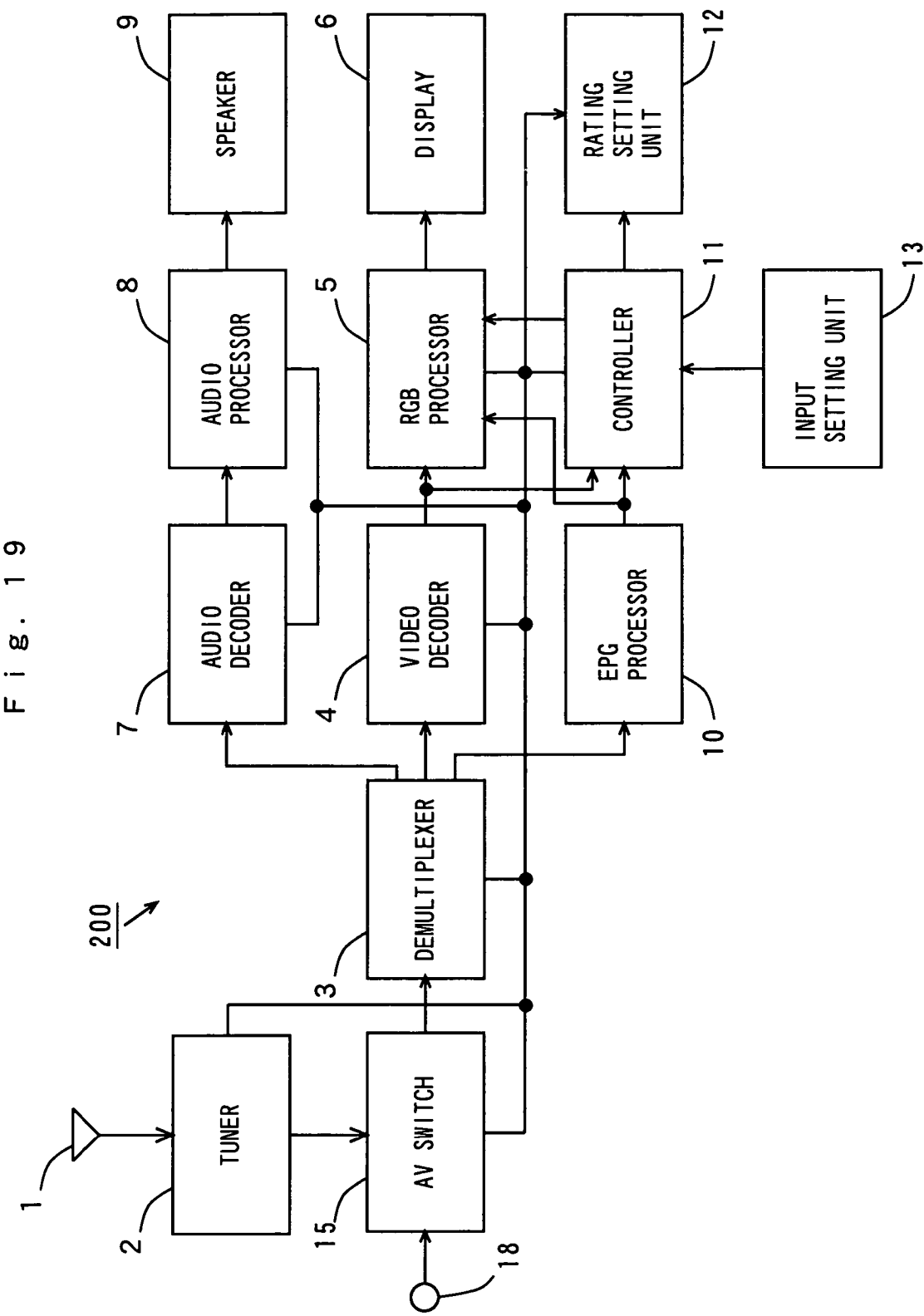
FIG. 19 is a block diagram showing the configuration of a television receiver according to a sixth embodiment.

FIG. 19 is a block diagram showing the configuration of a television receiver according to a sixth embodiment.

The television receiver 200 shown in FIG. 19 differs from the television receiver 200 shown in FIG. 3 in that a controller 11 further has the following function, and an AV (Audio Video) switch 15 is further provided.

The AV switch 15 switches input of an external signal from an external input terminal 18 to which a VTR or the like is connected and input of a television broadcasting signal from a tuner 2, and selectively feeds the external signal or the television broadcasting signal to a demultiplexer 3. The controller 11 switches an AV switch 15 in accordance with a request from an input setting unit 13.

Furthermore, the controller 11 judges, when the AV switch 15 is switched from the input of the external signal to the input of the television broadcasting signal in accordance with the request from the input setting unit 13, a receiving channel, and acquires second rating information on the receiving channel from an EPG processor 10.

Figure 20:
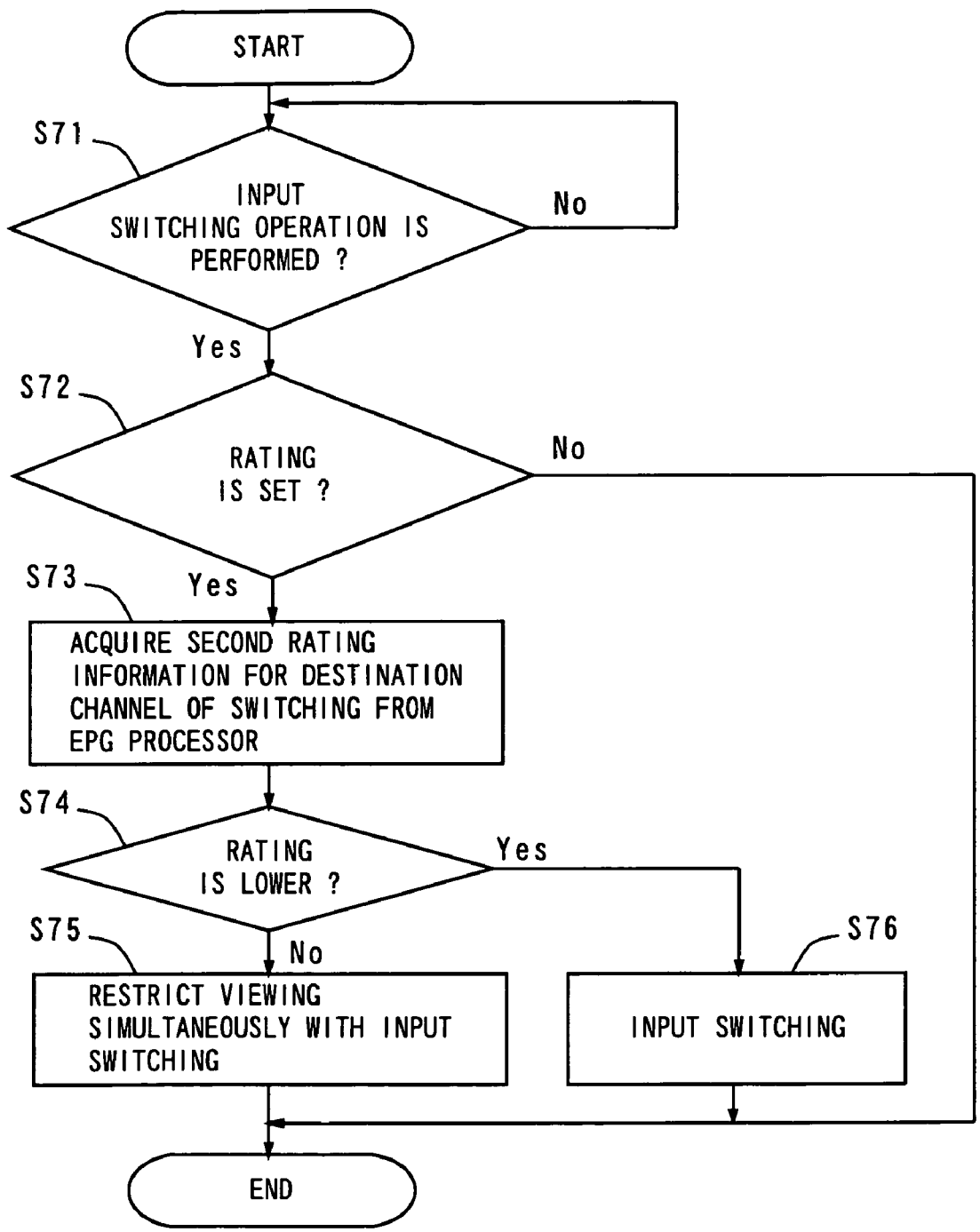
FIG. 20 is a flow chart showing the operations of a controller at the time of input switching.

FIG. 20 is a flow chart showing the operations of the controller 11 at the time of input switching.

The controller 11 first judges whether or not an input switching operation from the input of the external signal to the input of the television broadcasting signal is performed (step S71). When the above-mentioned input switching operation is performed, the controller 11 judges whether or not a rating is set by a rating setting unit 12 (step S72). When the rating is set, the controller 11 acquires second rating information on a destination channel of switching from the EPG processor 10 (step S73).

The controller 11 then judges whether or not a rating represented by the acquired second rating information is lower than the rating set by the rating setting unit 12 (step S74). When the rating represented by the second rating information is not less than the set rating, the controller 11 restricts viewing simultaneously with the input switching (step S75). When the rating represented by the second rating information is lower than the set rating, the controller 11 performs the input switching without restricting viewing (step S76).

In such a way, such a drawback that viewing is not restricted in a time period elapsed from the time of the switching from the input of the external signal to the input of the television broadcasting signal until the first rating information transmitted together with the television broadcasting signal is acquired is overcome.

In the present embodiment, the external input terminal 18 corresponds to an external signal input terminal, and the AV switch 15 corresponds to an input switching unit.

SEVENTH EMBODIMENT

The configuration of a television receiver according to a seventh embodiment of the present invention is the same as the configuration of the television receiver 200 show in FIG. 19. In the television receiver according to the present embodiment, a controller 11 further performs the following operations in addition to the operations in the sixth embodiment. The other operations of the television receiver according to the present embodiment are the same as the operations of the television receivers according to the first to third embodiments.

Figure 21:
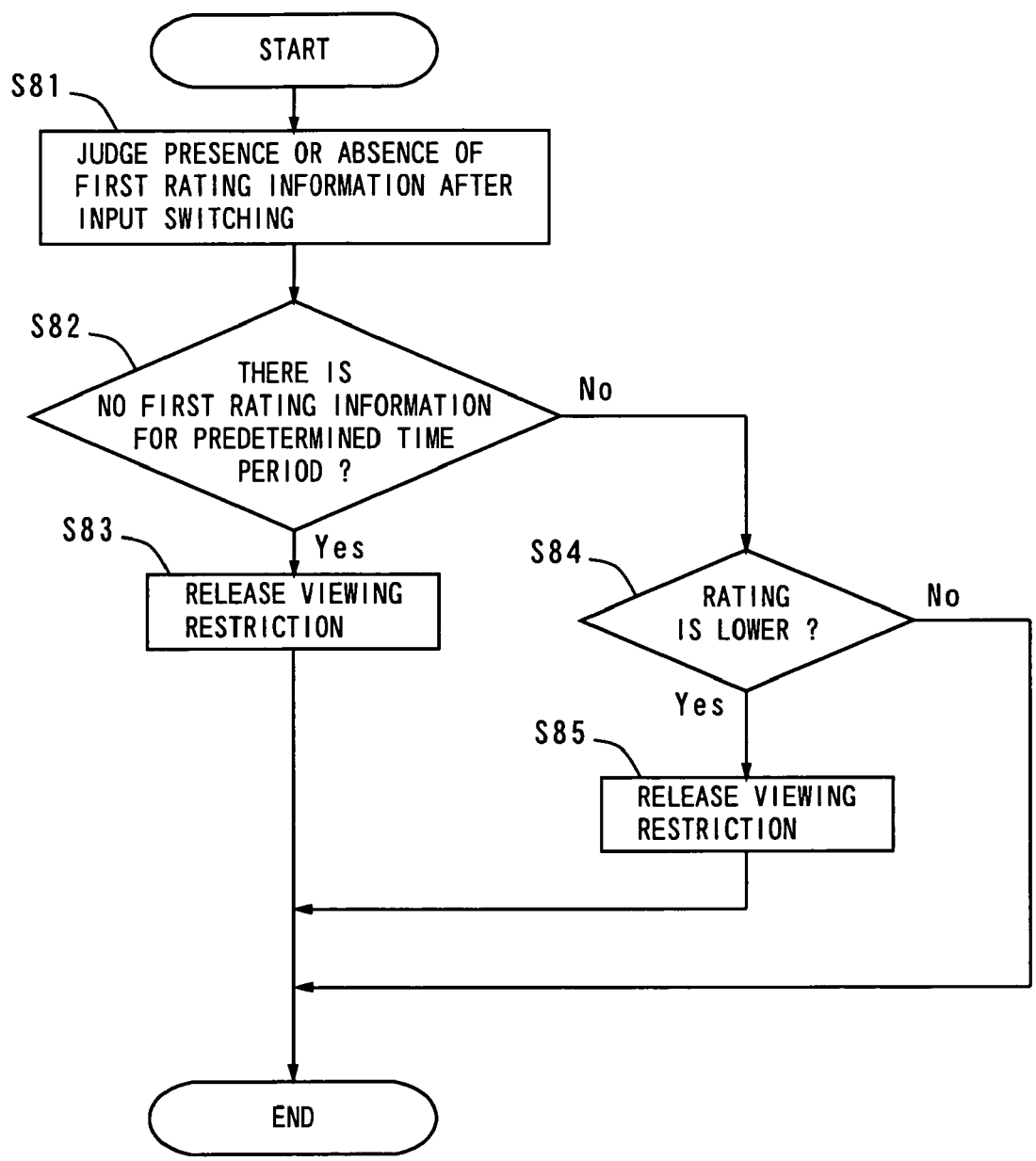
FIG. 21 is a flow chart showing the operations of a controller after input switching.

FIG. 21 is a flow chart showing the operations of the controller 11 after input switching.

The controller 11 first judges the presence or absence of first rating information transmitted together with a television broadcasting signal after input switching from input of an external signal to input of the television broadcasting signal (step S81), and it is judged whether or not there is no first rating information for a predetermined time period (step S82).

When there is no first rating information for a predetermined time period, the controller 11 releases the restriction of viewing (step S83). When the first rating information is acquired within the predetermined time period, the controller 11 judges whether or not a rating represented by the acquired first rating information is lower than the rating set by a rating setting unit 12 (step S84). When the rating represented by the first rating information is lower than the set rating, the controller 11 releases the restriction of viewing (step S85). When the rating represented by the first rating information is not less than the set rating, the controller 11 continues the restriction of viewing.

Figure 22:
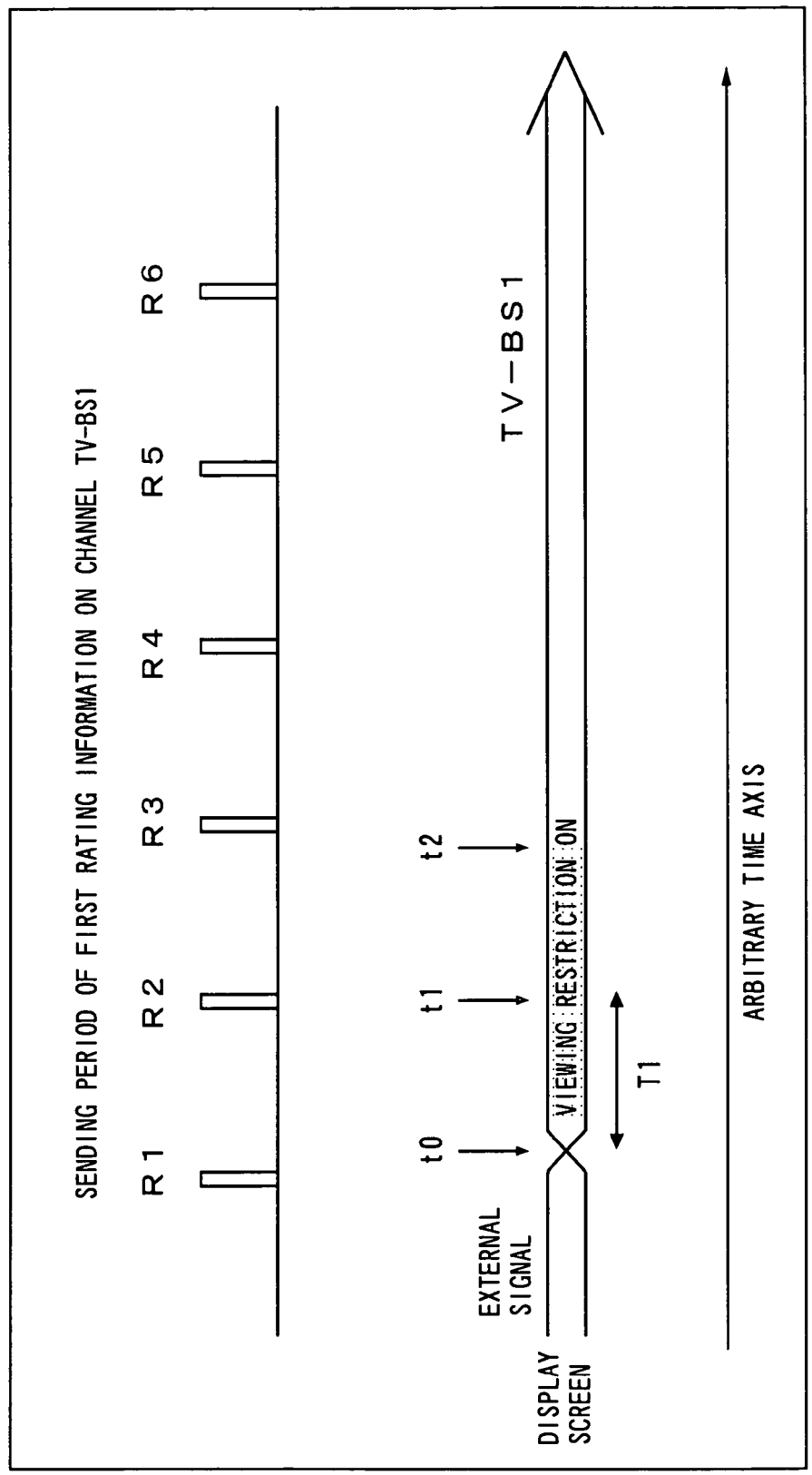
FIG. 22 is a diagram showing in a time series an example of processing in a seventh embodiment.

FIG. 22 is a diagram showing in a time series an example of processing in the seventh embodiment. As shown in FIG. 22, first rating information R1, R2, R3, . . . , R6 on Channel TV-BS1, together with a television broadcasting signal, shall be transmitted. In a case where a user switches input of an external signal from a VTR or the like to input of a television broadcasting signal on Channel TV-BS1 at a time point t1 immediately after transmitting the rating information R1 on Channel TV-BS1, the first rating information R1 is not acquired. In the present embodiment, viewing is restricted from a time point t0 of the input switching on the basis of second rating information included in EPG data. Therefore, viewing is restricted in a time period T1 elapsed from the time point t0 of the input switching until the first rating information R2 is acquired, so that a program is not displayed.

Thereafter, the first rating information R2 on Channel TV-BS1 is acquired at the time point t1. When the rating represented by the first rating information is lower than the set rating, the restriction of viewing is released.

When the first rating information is not acquired from the time point t0 of the input switching to a time point t2 after an elapse of a predetermined time period therefrom, the restriction of viewing is released.

When program organization is changed, the correction of the EPG data is not in time for the broadcasting of the program. Therefore, there occur situations where the second rating information included in the EPG data does not coincide with the rating of the program which is actually broadcast. In the present embodiment, the rating of the program which is actually broadcast can be properly judged on the basis of the first rating information included in the television broadcasting signal received after the input switching.

When the first rating information included in the television broadcasting signal is not acquired for not less than a predetermined time period, the restriction of viewing is released.

EIGHTH EMBODIMENT

Figure 23:
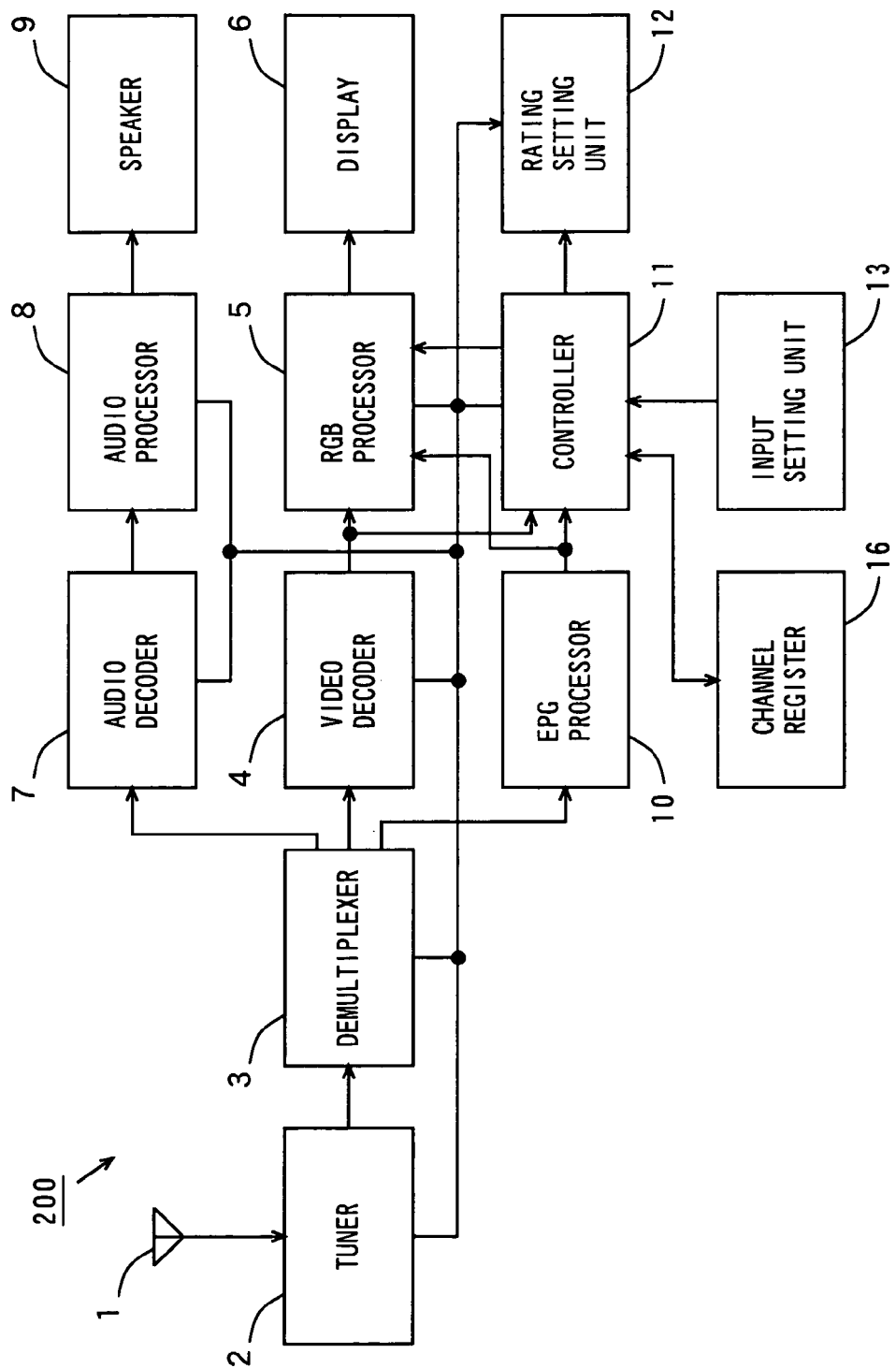
FIG. 23 is a block diagram showing the configuration of a television receiver according to an eighth embodiment.

FIG. 23 is a block diagram showing the configuration of a television receiver according to an eighth embodiment.

The television receiver 200 shown in FIG. 23 differs from the television receiver 200 shown in FIG. 3 in that a controller 11 and an input setting unit 13 further have the following functions, and a channel register 16 is further provided.

An input setting unit 13 has the function of requesting of the controller 11 rapid chain processing for alternately switching, every time a rapid chain key is pressed, a channel which is currently selected and a channel selected immediately before the rapid chain key is pressed. The channel register 16 stores at the time of the rapid chain processing the channel selected immediately before the rapid chain processing. When the television receiver 200 is started, a default channel is stored in the channel register 16. Further, the controller 11 reads out the channel stored in the channel register 16 in accordance with a request to perform the rapid chain processing from the input setting unit 13, and acquires second rating information on the channel from an EPG processor 10.

Figure 24:
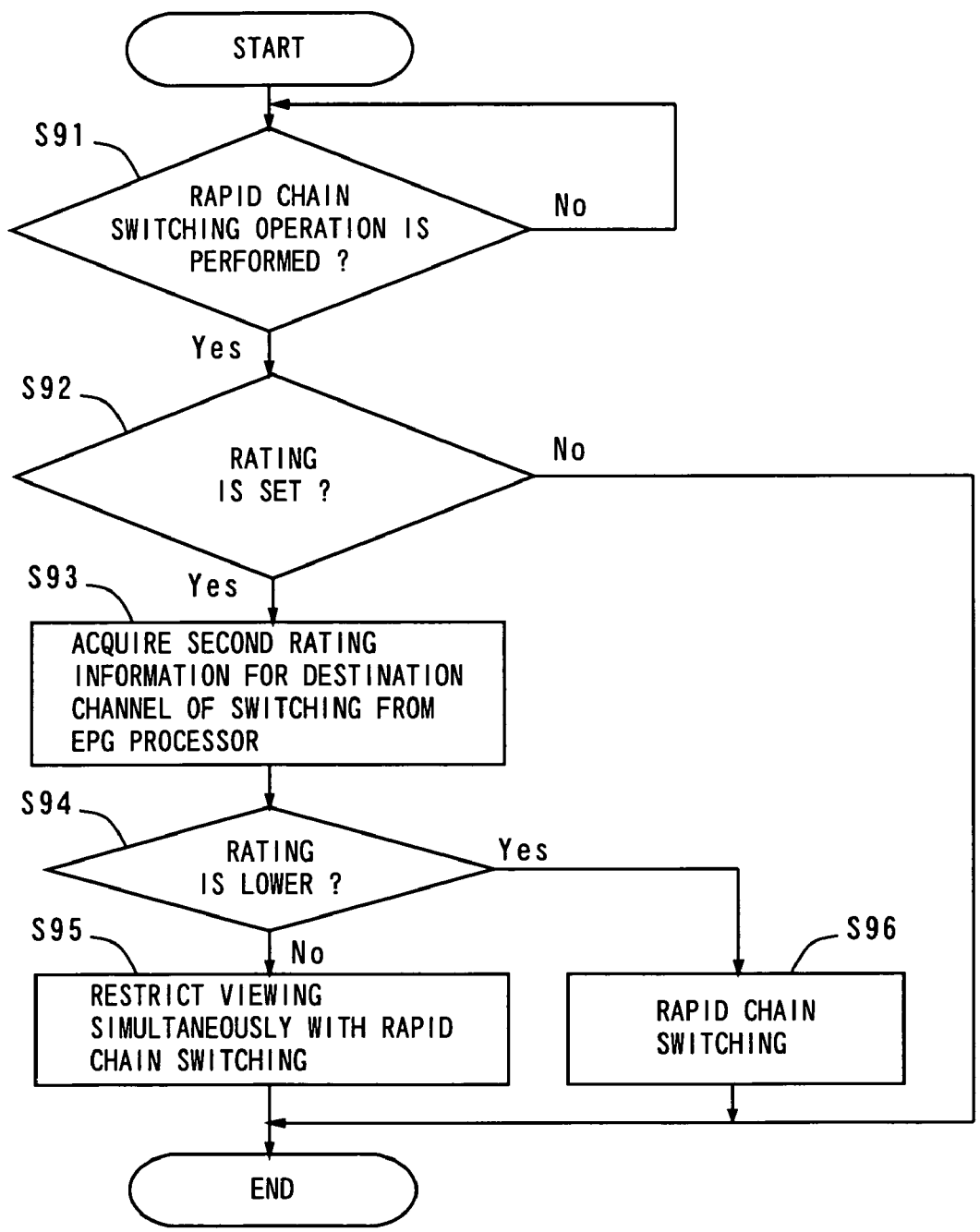
FIG. 24 is a flow chart showing the operations of a controller at the time of rapid chain switching.

FIG. 24 is a flow chart showing the operations of the controller 11 at the time of rapid chain switching.

The controller 11 first judges whether or not a rapid chain switching operation is performed from the input setting unit 13 by a user pressing the rapid chain key (step S91). When the above-mentioned rapid chain switching operation is performed, the controller 11 judges whether or not a rating is set by a rating setting unit 12 (step S92). When the rating is set, the controller 11 reads out a destination channel of switching from the channel register 16 and acquires second rating information on the destination channel of switching from the EPG processor 10 (step S93).

The controller 11 then judges whether or not a rating represented by the acquired second rating information is lower than the rating set by the rating setting unit 12 (step S94). When the rating represented by the second rating information is not less than the set rating, the controller 11 restricts viewing simultaneously with the rapid chain switching for selecting a channel (step S95). When the rating represented by the second rating information is lower than the set rating, the controller 11 performs the rapid chain switching for selecting a channel without restricting viewing (step S96).

In such a way, such a drawback that viewing is not restricted in a time period elapsed from the time of the rapid chain switching until the first rating information transmitted together with the television broadcasting signal is acquired is overcome.

In the present embodiment, the input setting unit 13 and the channel register 16 realize an alternately switching function.

NINTH EMBODIMENT

The configuration of a television receiver according to a ninth embodiment of the present invention is the same as the configuration of the television receiver 200 show in FIG. 23. In the television receiver according to the present embodiment, a controller 11 further performs the following operations in addition to the operations in the eighth embodiment. The other operations of the television receiver according to the present embodiment are the same as the operations of the television receivers according to the first to third embodiments.

Figure 25:
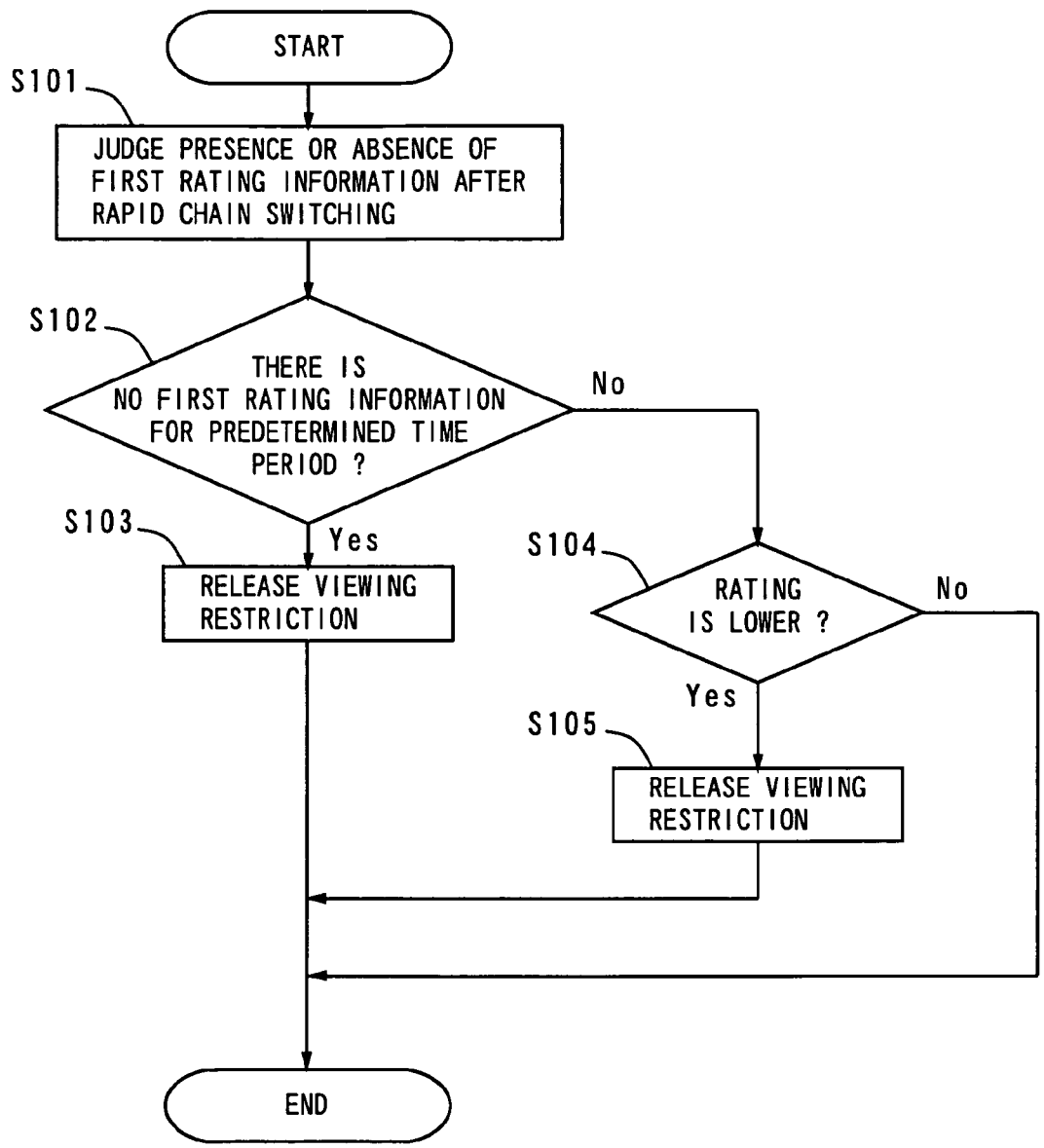
FIG. 25 is a flow chart showing the operations of a controller after rapid chain switching.
Figure 30:
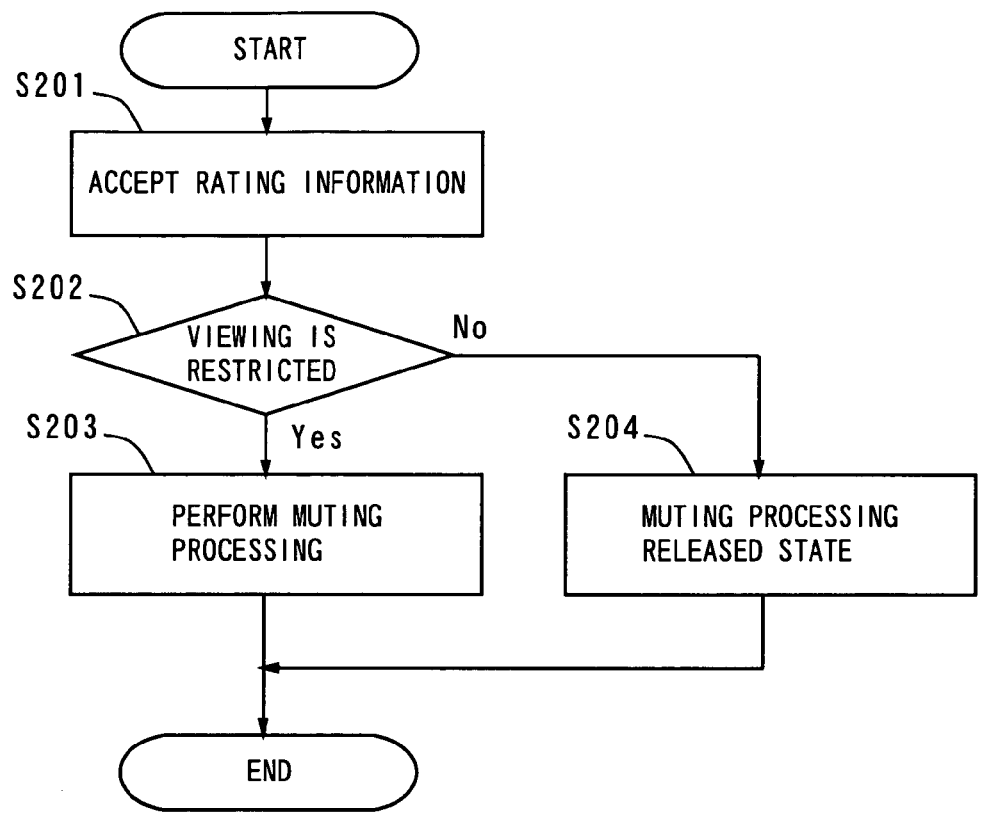
FIG. 30 is a flow chart showing the processing of a controller in the television receiver shown in FIG. 28.
Figure 31:
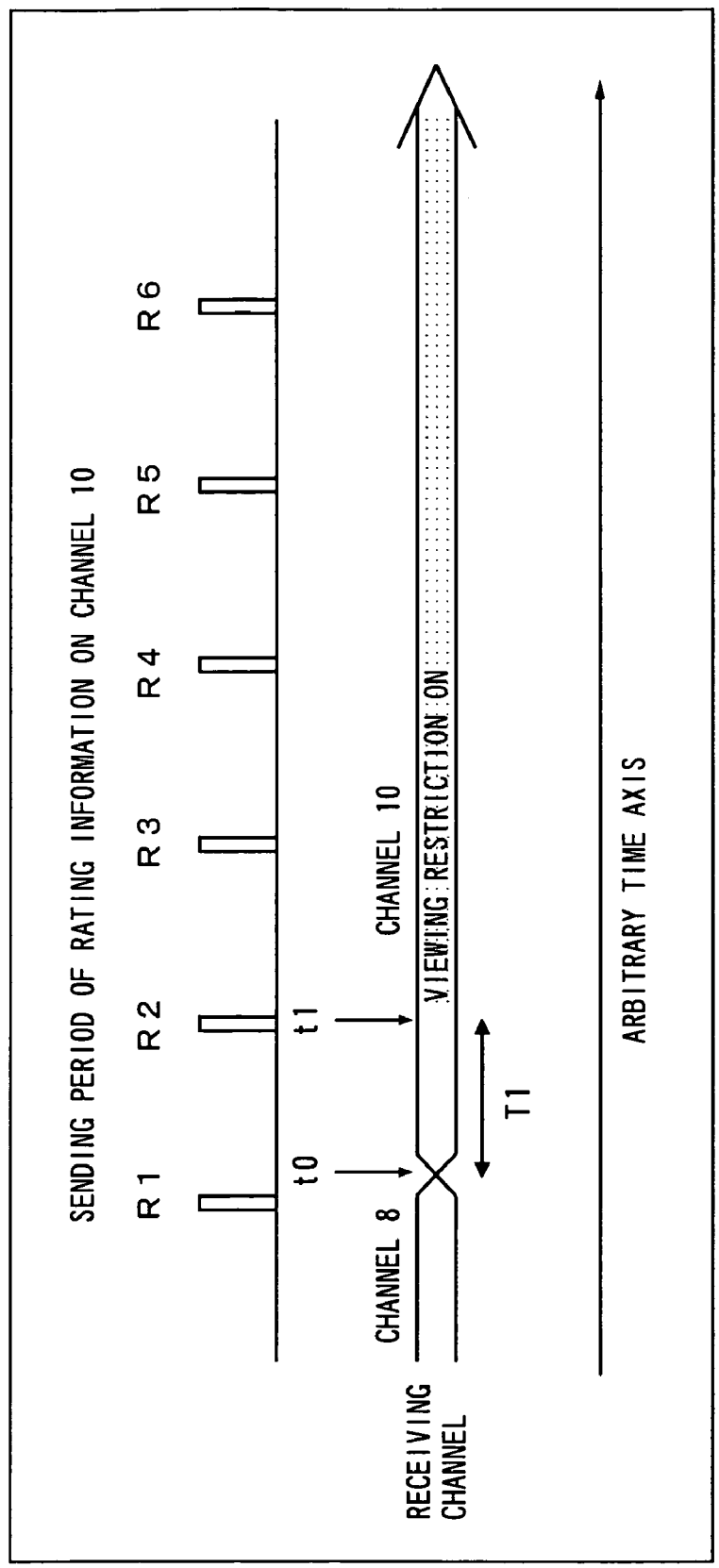
FIG. 31 is a diagram showing in a time series an example of viewing restriction processing.

FIG. 25 is a flow chart showing the operations of the controller 11 after rapid chain switching.

The controller 11 first judges the presence or absence of first rating information transmitted together with a television broadcasting signal after rapid chain switching (step S101), and it is judged whether or not there is no first rating information for a predetermined time period (step S102).

When there is no first rating information for a predetermined time period, the controller 11 releases the restriction of viewing (step S103). When the first rating information is acquired within the predetermined time period, the controller 11 judges whether or not a rating represented by the acquired first rating information is lower than the rating set by a rating setting unit 12 (step S104). When the rating represented by the first rating information is lower than the set rating, the controller 11 releases the restriction of viewing (step S105). When the rating represented by the first rating information is not less than the set rating, the controller 11 continues the restriction of viewing.

FIG. 26 is a diagram showing in a time series an example of processing in the ninth embodiment. As shown in FIG. 26, first rating information R1, R2, R3, . . . , R6 on a channel selected by the rapid chain switching, together with a television broadcasting signal, shall be transmitted. In a case where a user switches a receiving channel by pressing a rapid chain key at a time point t0 immediately after transmitting the rating information R1 on the channel selected by the rapid chain switching, the first rating information R1 is not acquired. In the present embodiment, viewing is restricted from the time point t0 of the rapid chain switching on the basis of second rating information included in EPG data. Therefore, viewing is also restricted in a time period T1 elapsed from the time point t0 of the rapid chain switching until the first rating information R2 is acquired, so that a program is not displayed.

Thereafter, the first rating information R2 on Channel TV-BS1 selected by the rapid chain switching is acquired at a time point t1. When the rating represented by the first rating information is lower than the set rating, the restriction of viewing is released.

When the first rating information is not acquired from the time point t0 of the rapid chain switching to a time point t2 after an elapse of a predetermined time period therefrom, the restriction of viewing is released.

When program organization is changed, the correction of the EPG data is not in time for the broadcasting of the program. Therefore, there occur situations where the second rating information included in the EPG data does not coincide with the rating of the program which is actually broadcast. In the present embodiment, the rating of the program which is actually broadcast can be properly judged on the basis of the first rating information included in the television broadcasting signal received after the rapid chain switching.

When the first rating information included in the television broadcasting signal is not acquired for not less than a predetermined time period, the restriction of viewing is released.

According to the present invention, the output of the program by the program output unit is restricted on the basis of the second rating information extracted from the electronic program guide information. Accordingly, it can be recognized whether or not viewing should be restricted before the first rating information transmitted together with the television broadcasting signal is received. Consequently, a drawback of the program which should be restricted being output at the time when the program is actually broadcast is overcome.

The invention claimed is:

1. A viewing restricting apparatus, comprising:
a receiver that receives a television broadcasting signal that includes first rating information that indicates a level of viewing restriction for restricting viewing, and receives electronic program guide information that includes second rating information that indicates a level of viewing restriction for restricting viewing;
a program outputter that outputs a video or an audio of a program on the basis of the television broadcasting signal received by said receiver; and
a controller that restricts the output of the program from said program outputter, wherein
said controller has
a first information extractor that extracts the first rating information from the television broadcasting signal received by said receiver,
a first output restrictor that restricts the output of the program by said program outputter on the basis of the first rating information extracted by said first information extractor,
a second information extractor that extracts the second rating information from the electronic program guide information received by said receiver,
a second output restrictor that restricts the output of the program from said program outputter on the basis of the second rating information extracted by said second information extractor, and
said controller restricts the output of the program from said program outputter on the basis of the second rating information before the television broadcasting signal is received by the receiver, and then, when a receiving channel of the receiver is switched to receive the television broadcasting signal of the program, extracts the first rating information and restricts the output of the program from said program outputter on the basis of the extracted first rating information.

2. The viewing restricting apparatus according to claim 1, further comprising:
a rating setter that sets the rating of the program whose viewing should be restricted,
said controller restricting the output of the program from said program outputter on the basis of the rating set by said rating setter.

3. The viewing restricting apparatus according to claim 1, wherein
said program outputter comprises:
a video display for displaying a video; and
a video signal processor that extracts a video signal from the television broadcasting signal received by said receiver, and displays the video of the program on said video display.

4. The viewing restricting apparatus according to claim 1, wherein
said program outputter comprises
an audio outputter for outputting audio; and
an audio signal processor that extracts an audio signal from the television broadcasting signal received by said receiver, and outputs the audio of the program from said audio outputter.

5. The viewing restricting apparatus according to claim 1, further comprising:
an information holder that holds the electronic program guide information received by said receiver; and
an electronic program guide display for displaying an electronic program guide on the basis of the electronic program guide information held by said information holder.

6. The viewing restricting apparatus according to claim 1, wherein
said controller has a program reserver that reserves the output of the program from said program outputter, and a reservation restrictor that restricts the reservation of the program by said program reserver on the basis of the second rating information extracted from the electronic program guide information.

7. The viewing restricting apparatus according to claim 6, further comprising:
a reservation possibility/impossibility presenter that presents the possibility/impossibility of the reservation by said reservation restrictor.

8. The viewing restricting apparatus according to claim 1, further comprising:
a recording reservation commander that commands a recorder to reserve the recording of the video or the audio of the program,
said controller having a recording reservation restrictor that restricts the command to reserve the recording by said recording reservation commander on the basis of the second rating information extracted from the electronic program guide information.

9. The viewing restricting apparatus according to claim 8, further comprising:
a recording reservation possibility/impossibility presenter that presents the possibility/impossibility of the command to reserve the recording by said recording reservation restrictor.

10. The viewing restricting apparatus according to claim 1, wherein
said second rating information has the same data structure as that of said first rating information.

11. The viewing restricting apparatus according to claim 1, wherein
said first information extractor, said first output restrictor, said second information extractor and said second output restrictor are realized by common software.

12. The viewing restricting apparatus according to claim 1, wherein
said second rating information is encoded in the electronic program guide information and transmitted.

13. The viewing restricting apparatus according to claim 1, further comprising:
a channel switcher that switches a receiving channel by said receiver,
said controller extracting the second rating information from the electronic program guide information received by said receiver in response to the switching of the channel by said channel switcher, and restricting the output of the program from said program outputter on the basis of the extracted second rating information.

14. The viewing restricting apparatus according to claim 1, further comprising:
an external input terminal that receives an external signal; and
an input switcher that switches input of the television broadcasting signal received by said receiver and input of the external signal from said external input terminal, to feed the television broadcasting signal or the external signal to said program outputter,
said controller extracting the second rating information from the electronic program guide information received by said receiver in response to the switching from the input of the external signal to the input of the television broadcasting signal by said input switcher, and restricting the output of the program from said program outputter on the basis of the extracted second rating information.

15. The viewing restricting apparatus according to claim 14, wherein
said controller restricts the output of the program from said program outputter on the basis of the second rating information extracted when the input is switched by said input switcher, and then extracts the first rating information from the television broadcasting signal received by said receiver to restrict the output of the program from said program outputter on the basis of the extracted first rating information.

16. The viewing restricting apparatus according to claim 13, wherein
said channel switcher has an alternately switching function for alternately switching for each operation of a predetermined key a channel currently selected and a channel selected immediately before the operation of the predetermined key, and
said controller extracts the second rating information from the electronic program guide information received by said receiver in response to the switching of the channel by the alternately switching function of said channel switcher, and restricts the output of the program from said program outputter on the basis of the extracted second rating information.

17. The viewing restricting apparatus according to claim 16, wherein
said controller restricts the output of the program from said program outputter on the basis of the second rating information extracted when the channel is switched by the alternately switching function of said channel switcher, and then extracts the first rating information from the television broadcasting signal received by said receiver to restrict the output of the program from said program outputter on the basis of the extracted first rating information.

18. A viewing restricting system, comprising:
a transmitter that transmits a television broadcasting signal that includes first rating information that indicates a level of viewing restriction for restricting viewing, and transmits electronic program guide information; that includes second rating information that indicates a level of viewing restriction for restricting viewing; and
a first receiver that receives the television broadcasting signal and the electronic program guide information transmitted by said transmitter,
said first receiver comprising:
a second receiver that receives the television broadcasting signal that includes the first rating information transmitted by said transmitter, and receives the electronic program guide information that includes the second rating information transmitted by said transmitter;
a program outputter that outputs a video or an audio of a program on the basis of the television broadcasting signal received by said second receiver; and
a controller that extracts the first rating information from the television broadcasting signal received by said second receiver, extracts the second rating information from the electronic program guide information received by said second receiver, and restricts the output of the program from said program outputter,
wherein said controller restricts the output of the program from said program outputter on the basis of the second rating information before the television broadcasting signal is received by the second receiver, and then, when a receiving channel of the second receiver is switched to receive the television broadcasting signal of the program, extracts the first rating information and restricts the output of the program from said program outputter on the basis of the extracted first rating information.

19. A computer-readable medium encoded with computer executable instructions for restricting viewing in a television receiver comprising a receiver that receives a television broadcasting with that includes first rating information that indicates a level of viewing restriction for restricting viewing and receives electronic program guide information that includes second rating information that indicates of level of viewing restriction for restricting viewing, and a program outputter that outputs a video or an audio of a program on the basis of the television broadcasting signal received by said receiver, the instructions causing the computer to execute:
extracting the first rating information from the television broadcasting signal received by the receiver;
extracting the second rating information from the electronic program guide information received by the receiver, the electronic program guide information being received prior to a reception of the television broadcasting signal that includes the first rating information; and
restricting the output of the program from the program outputter on the basis of the second rating information before the television broadcasting signal is received by the receiver, and then, when a receiving channel of the receiver is switched to receive the television broadcasting signal of the program, restricting the output of the program from the program outputter on the basis of the extracted first rating information.

* * * * *